United States Patent [19]

Sakkab

[11] 4,256,597

[45] Mar. 17, 1981

[54] COMPOSITION FOR COMBINED WASHING AND BLEACHING OF FABRICS

[75] Inventor: Nabil Y. Sakkab, Maineville, Ohio

[73] Assignee: The Procter & Gamble Company, Cincinnati, Ohio

[21] Appl. No.: 2,275

[22] Filed: Jan. 10, 1979

[30] Foreign Application Priority Data

Jan. 11, 1978 [PH] Philippines ............................. 20643

[51] Int. Cl.³ ........................... C11D 7/56; C11D 7/32
[52] U.S. Cl. ........................... 252/99; 252/95; 8/101; 8/103
[58] Field of Search ............... 252/95, 99; 8/101, 103, 8/1 XA

[56] References Cited

U.S. PATENT DOCUMENTS

| | | |
|---|---|---|
| 2,670,265 | 2/1954 | Heyna . |
| 2,706,199 | 4/1955 | Brentano ........................ 260/314.5 |
| 2,951,797 | 9/1960 | Sharp ........................ 204/158 |
| 2,951,798 | 9/1960 | Sharp ........................ 204/162 |
| 2,951,799 | 9/1960 | Sharp ........................ 204/162 |
| 2,951,800 | 9/1960 | Sharp ........................ 204/162 |
| 3,927,967 | 12/1975 | Speakman ........................ 8/103 |
| 4,033,718 | 7/1977 | Holcombe et al. ................. 25/95 X |
| 4,077,768 | 3/1978 | Johnston et al. ................. 252/95 X |
| 4,094,806 | 6/1978 | Wiers ................. 252/95 X |

FOREIGN PATENT DOCUMENTS

| | | |
|---|---|---|
| 1266094 | 8/1961 | France . |
| 9803093 | 9/1978 | Netherlands . |
| 471418 | 8/1937 | United Kingdom . |
| 613781 | 12/1948 | United Kingdom . |
| 876691 | 9/1961 | United Kingdom . |

OTHER PUBLICATIONS

Lubs, "The Chemistry of Synthetic Dyes & Pigments, Krieger Pub. Co., 1972, pp. 577-624.
Moser and Thomas, "Phthalocyamine Compounds, Reinhold 1963, pp. 308-327.
Color Index, pp. 4617-4626.
Journal of the Chemical Society, 1938, Dent, pp. 1-6.

*Primary Examiner*—Mayer Weinblatt
*Attorney, Agent, or Firm*—William H. Gould; Thomas H. O'Flaherty; Richard C. Witte

[57] ABSTRACT

Combined washing and bleaching of fabrics is accomplished by use of a composition comprising surfactant and a photoactivator. The surfactant is anionic, nonionic, semi-polar, ampholytic, or zwitterionic in nature. The photoactivator is a porphine or a mono-, di-, tri-, or tetra-aza porphine, solubilized with anionic, nonionic and/or cationic substituent groups, and metal free or metallated with Zn(II), Ca(II), Cd(II), Mg(II), Sc(III), Al(III) or Sn(IV).

32 Claims, 1 Drawing Figure

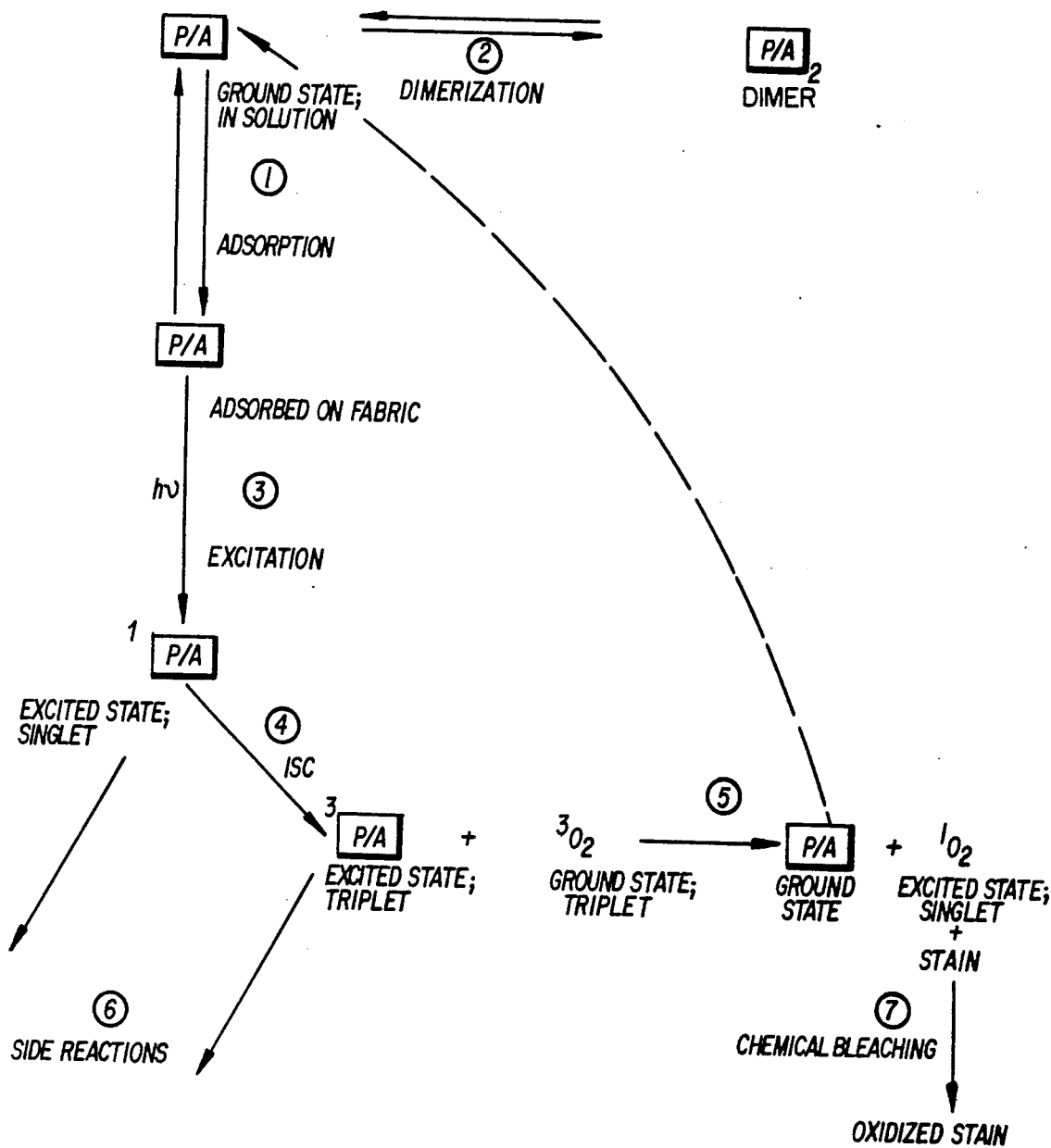

COMPOSITION FOR COMBINED WASHING AND BLEACHING OF FABRICS

BACKGROUND OF THE INVENTION

This invention relates to household laundry processes for combined washing and bleaching of fabrics, and to simultaneous removal of stains and fugitive dyes.

U.S. Pat. No. 3,927,967 granted to Speakman on Dec. 23, 1975 related to a household washing and bleaching process for cotton fabrics utilizing photo-activating compounds, principally sulfonated zinc phthalocyanine, in the presence of visible light and atmospheric oxygen. Japanese Patent application OPI 50-113,479 assigned to The Procter & Gamble Company, laid open to the public on Sept. 5, 1975, teaches the use of specific mixtures of sulfonated zinc phthalocyanine species, principally tri- and tetra-sulfonates, as preferred bleach photoactivators. In each of the foregoing references the detergent compositions utilizing sulfonated zinc phthalocyanine contained both organic surfactant and alkaline builder salt.

Belgian Pat. No. 840,348 invented by Wiers, granted on Oct. 4, 1976 discloses the use of zinc phthalocyanine tri- and tetra-sulfonates as bleach photoactivators in unbuilt liquid detergent compositions.

British Pat. No. 1,372,036 invented by Speakman and available to the public on Oct. 30, 1974 describes a washing machine provided with source of visible light which irradiates wash liquor containing phthalocyanine photoactivator and fabrics.

U.S. Pat. Nos. 2,951,797; 2,951,798; 2,951,799; and 2,951,800, assigned to Monsanto Chemical Company and issued on Sept. 6, 1960 describe certain porphines as catalysts for the photo-oxidation of olefins.

References to carboxylated porphines have appeared in U.S. Pat. 2,706,199 issued April 12, 1955, invented by Brentano et al, and C.R. Acad. Sci., Ser. C 1972, 275(11), 573-6 authored by Gaspard et al. See also Color Index No. 74320. References to aminosulfonyl porphines are West German OLS No. 2,057,194 laid open June 8, 1972, invented by Von der Eltz et al; British Pat. No. 613,781 accepted Dec. 2, 1948, invented by Mayhew; and British Pat. No. 876,691 published Sept. 6, 1961, issued to Geigy A.G. See also Color Index No. 74350. Other substituted porphines are disclosed in Austrian Pat. No. 267,711 issued Jan. 10, 1969, invented by Wimmer; French Pat. No. 1,266,094 published May 29, 1961, invented by Tartter et al; U.S. Pat. No. 2,670,265 issued Feb. 23, 1954, invented by Heyna et al; British Pat. No. 471,418 accepted Aug. 30, 1937, invented by Groves; and JCS 1938, 1-6 authored by Dent.

It has now been found that certain species of photoactivators other than sulfonated phthalocyanines perform a similar fabric bleaching function in the presence of visible light and atmospheric oxygen, and indeed under some circumstances are superior thereto. These other photo-activators provide in fact not only stain removal but also improved whitening of the fabrics in two other respects: the first of these is an improvement in the general whiteness of the fabrics, which is often referred to as whiteness maintenance; this improvement is not however accomplished in the ordinary way by reducing the reprecipitation of dirt upon cleaned fabrics, but rather by oxygen bleaching of the overall fabric discoloration that is often present in soiled fabrics even after washing with ordinary detergent compositions.

The second respect in which whiteness can be improved by the compositions of this invention is in the removal of so-called fugitive dyes—the tendency of some colored fabrics to release dye into the laundering solutions, which dye is then transferred during laundering onto other fabrics being washed therewith. Dye transfer removal using peroxy acids together with chemical activators is the subject of U.S. Pat. No. 3,822,114 granted on July 2, 1974 to Montgomery and Jones and commonly assigned U.S. Pat. application Ser. No. 583,383 filed on June 3, 1975 (Montgomery). Dye transfer removal using peroxy compounds such as hydrogen peroxide or sodium perborate catalyzed by porphines and phthalocyanines chelated with iron, and only iron, is the subject of commonly assigned U.S. Pat. application Ser. No. 697,006 filed on June 17, 1976 (Johnson and Tate).

The foregoing objects of this invention can be conveniently accomplished by a washing process which is followed by drying out-of-doors, especially in direct sunlight as on a clothesline. The common procedure of soaking fabrics in the wash/bleach solution prior to the actual washing process is an especially effective way to accomplish the objects of this invention.

SUMMARY OF THE INVENTION

This invention relates to a detergent bleach composition comprising an anionic, nonionic, semi-polar, ampholytic, or zwitterionic surfactant and from 0.005% to 0.5% by weight of the composition of a water soluble photoactivator having the formula

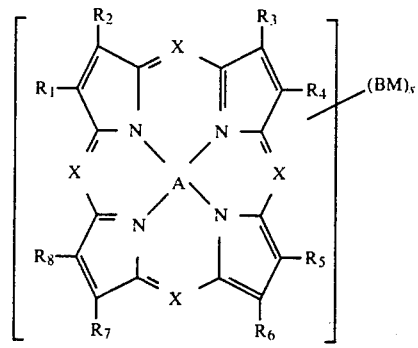

wherein each X is ($=$N—) or ($=$CY—), and the total number of ($=$N—) groups is 0, 1, 2, 3 or 4; wherein each Y, independently, is hydrogen or meso substituted alkyl, cycloalkyl, aralkyl, aryl, alkaryl or heteroaryl; wherein each R, independently, is hydrogen or pyrrole substituted alkyl, cycloalkyl, aralkyl, aryl, alkaryl or heteroaryl, or wherein adjacent pairs of R's are joined together with ortho-arylene groups to form pyrrole substituted alicyclic or heterocyclic rings; wherein A is 2(H) atoms bonded to diagonally opposite nitrogen atoms, or Zn(II), Ca(II), Mg(II), Sc(III), Al(III) or Sn(IV); wherein B is an anionic, nonionic or cationic solubilizing group substituted into Y or R; wherein M is a counterion to the solubilizing groups; and wherein s is the number of solubilizing groups.

Preferred cationic solubilizing groups are quaternary pyridinium and quaternary ammonium groups. Preferred anionic solubilizing groups are carboxylate, polyethoxy carboxylate, sulfate, polyethoxy sulfate, phosphate, polyethoxy phosphate, and remote sulfonate. Preferred nonionic solubilizing groups are polyethoxylates.

For cationic solubilizing groups M, the counterion, is an anion such as halide and s is from 1 to about 8. For polyethoxylate nonionic solubilizing groups—$(CH_2CH_2O)_nH$, M is zero, s is from 1 to about 8, and N $=(sn)=$ the number of (condensed ethylene oxide molecules per porphine molecule) is from about 8 to about 50. For anionic groups M, the counterion, is cationic. For anionic groups attached to atoms no more than 5 atoms displaced from the porphine core, i.e. for "proximate" anionic groups as defined herein, s is than 5 atoms displaced from the porphine core, i.e. for "remote" anionic groups as defined herein, s is from 2 to about 8. Sulfonate groups are remote and their number is no greater than the number of aromatic or heterocyclic substituent groups.

The solubilizing groups on a given porphine photoactivator of this invention can be, but need not be, all alike; they can be different not only as to their precise structure but also as to their electrical charge. Thus cationic, anionic, and/or nonionic solubilizing groups can be present on an individual photoactivator molecule.

In the foregoing description, the term "alkyl" is defined to be not only a simple carbon chain but also a carbon chain interrupted by other chain-forming atoms, such as O, N or S. Non-limiting examples of such interruptions are those of the following groups:

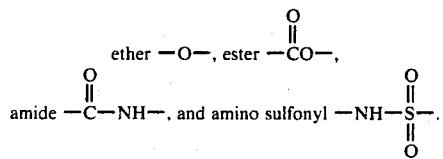

DETAILED DESCRIPTION OF THE INVENTION

The essential components of the instant invention are two in number. One is a surfactant which can be anionic, nonionic, semi-polar, ampholytic, or zwitterionic in nature, or can be mixtures thereof. Surfactants can be used at levels from about 10% to about 50% of the composition by weight, preferably at levels from about 15% to about 30% by weight.

Preferred anionic non-soap surfactants are water soluble salts of alkyl benzene sulfonate, alkyl sulfate, alkyl polyethoxy ether sulfate, paraffin sulfonate, alpha-olefin sulfonate, alpha-sulfocarboxylates and their esters, alkyl glyceryl ether sulfonate, fatty acid monoglyceride sulfates and sulfonates, alkyl phenol polyethoxy ether sulfate, 2-acyloxy-alkane-1-sulfonate, and beta-alkyloxy alkane sulfonate. Soaps are also preferred anionic surfactants.

Especially preferred alkyl benzene sulfonates have about 9 to about 15 carbon atoms in a linear or branched alkyl chain, more especially about 11 to about 13 carbon atoms. Especially preferred alkyl sulfate has about 8 to about 22 carbon atoms in the alkyl chain, more especially from about 12 to about 18 carbon atoms. Especially preferred alkyl polyethoxy ether sulfate has about 10 to about 18 carbon atoms in the alkyl chain and has an average of about 1 to about 12—$CH_2CH_2O$— groups per molecule, especially about 10 to about 16 carbon atoms in the alkyl chain and an average of about 1 to about 6—$CH_2CH_2O$— groups per molecule.

Especially preferred paraffin sulfonates are essentially linear and contain from about 8 to about 24 carbon atoms, more especially from about 14 to about 18 carbon atoms. Especially preferred alpha-olefin sulfonate has about 10 to about 24 carbon atoms, more especially about 14 to about 16 carbon atoms; alpha-olefin sulfonates can be made by reaction with sulfur trioxide followed by neutralization under conditions such that any sultones present are hydrolyzed to the corresponding hydroxy alkane sulfonates. Especially preferred alpha-sulfocarboxylates contain from about 6 to about 20 carbon atoms; included herein are not only the salts of alpha-sulfonated fatty acids but also their esters made from alcohols containing about 1 to about 14 carbon atoms.

Especially preferred alkyl glyceryl ether sulfates are ethers of alcohols having about 10 to about 18 carbon atoms, more especially those derived from coconut oil and tallow. Especially preferred alkyl phenol polyethoxy ether sulfate has about 8 to about 12 carbon atoms in the alkyl chain and an average of about 1 to about 10 —$CH_2CH_2O$—groups per molecule. Especially preferred 2-acyloxy-alkane-1-sulfonates contain from about 2 to about 9 carbon atoms in the aryl group and about 9 to about 23 carbon atoms in the alkane moiety. Especially preferred beta-alkyloxy alkane sulfonate contains about 1 to about 3 carbon atoms in the alkyl group and about 8 to about 20 carbon atoms in the alkyl moiety.

The alkyl chains of the foregoing non-soap anionic surfactants can be derived from natural sources such as coconut oil or tallow, or can be made synthetically as for example using the Ziegler or Oxo processes. Water solubility can be achieved by using alkali metal, ammonium, or alkanolamine cations; sodium is preferred. Magnesium and calcium are preferred cations under circumstances described by Belgian patent 843,636 invented by Jones et al, issued December 30, 1976. Mixtures of anionic surfactants are contemplated by this invention; a preferred mixture contains alkyl benzene sulfonate having 11 to 13 carbon atoms in the alkyl group and alkyl polyethoxy alcohol sulfate having 10 to 16 carbon atoms in the alkyl group and an average degree of ethoxylation of 1 to 6.

Especially preferred soaps contain about 8 to about 24 carbon atoms, more especially about 12 to about 18 carbon atoms. Soaps can be made by direct saponification of natural fats and oils such as coconut oil, tallow and fish oil, or by the neutralization of free fatty acids obtained from either natural or synthetic sources. The soap cation can be alkali metal, ammonium or alkanolammonium; sodium is preferred.

Preferred nonionic surfactants are water soluble compounds produced by the condensation of ethylene oxide with a hydrophobic compound such as an alcohol, alkyl phenol, polypropoxy glycol, or polypropoxy ethylene diamine.

Especially preferred polyethoxy alcohols are the condensation product of 1 to 30 mols of ethylene oxide with 1 mol of branched or straight chain, primary or secondary aliphatic alcohol having from about 8 to about 22 carbon atoms; more especially 1 to 6 mols of ethylene oxide condensed with 1 mol of straight or branched chain, primary or secondary aliphatic alcohol having from about 10 to about 16 carbon atoms; certain species of polyethoxy alcohols are commercially available from the Shell Chemical Company under the trade name 'Neodol'. Especially preferred polyethoxy alkyl phenols are the condensation product of about 1 to about 30 mols of ethylene oxide with 1 mol of alkyl phenol having a branched or straight chain alkyl group containing about 6 to about 12 carbon atoms; certain species of polyethoxy alkyl phenols are commercially available from the GAF Corporation under the trade name 'Igepal'.

Especially preferred polyethoxy polypropoxy glycols are commercially available from BASF-Wyandotte under the trade name 'Pluronic'. Especially preferred condensates of ethylene oxide with the reaction product of propylene oxide and ethylene diamine are commercially available from BASF-Wyandotte under the trade name 'Tetronic'.

Preferred semi-polar surfactants are water soluble amine oxides containing one alkyl moiety of from about 10 to 28 carbon atoms and 2 moieties selected from the group consisting of alkyl groups and hydroxyalkyl groups containing from 1 to about 3 carbon atoms, and especially alkyl dimethyl amine oxides wherein the alkyl group contains from about 11 to 16 carbon atoms; water soluble phosphine oxide detergents containing one alkyl moiety of about 10 to 28 carbon atoms and 2 moieties selected from the group consisting of alkyl groups and hydroxyalkyl groups containing from about 1 to 3 carbon atoms; and water soluble sulfoxide detergents containing one alkyl moiety of from about 10 to 28 carbon atoms and a moiety selected from the group consisting of alkyl and hydroxyalkyl moieties of from 1 to 3 carbon atoms.

Preferred ampholytic surfactants are water soluble derivatives of aliphatic secondary and tertiary amines in which the aliphatic moiety can be straight chain or branched and wherein one of the aliphatic substituents contains from about 8 to 18 carbon atoms and one contains an anionic water-solubilizing group, e.g. carboxy, sulfonate, sulfate, phosphate, or phosphonate.

Preferred zwitterionic surfactants are water soluble derivatives of aliphatic quaternary ammonium, phosphonium and sulfonium cationic compounds in which the aliphatic moieties can be straight chain or branched, and wherein one of the aliphatic substituents contains from about 8 to 18 carbon atoms and one contains an anionic water solubilizing group, especially alkyl-dimethylammonio-propane-sulfonates and alkyl-dimethylammoniohydroxy-propane-sulfonates wherein the alkyl group in both types contains from about 14 to 18 carbon atoms.

A typical listing of the classes and species of surfactants useful in this invention appear in U.S. Pat. No. 3,664,961 issued to Norris on May 23, 1972 and hereby incorporated herein by reference. This listing, and the foregoing recitation of specific surfactant compounds and mixtures which can be used in the instant compositions, are representative of such materials but are not intended to be limiting.

The other essential component of the instant invention is a photoactivator as described hereinbelow. This component can also be described as a photochemical activator, or as a photosensitizer: these terms are synonymous. Before describing the photoactivator in detail, a discussion of chemical nomenclature will be appropriate. The structure of the compound porphine is:

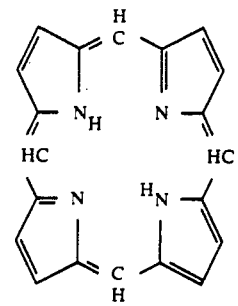

[S] porphine

Porphine has a large closed ring designated as a macrocyclic structure, and more specifically as a quadridentate macrocyclic molecule. Porphine can be described as tetramethine tetrapyrrole, and has also been designated as porphin or porphyrin. This structure is sometimes referred to herein as the porphine 'core', because the photoactivators of this invention are species of substituted porphines.

One form of substitution involves substituting 1, 2, or 4 aza groups (=N—) for the methine groups (=CH—) in porphine. As an example of conventional nomenclature, a compound having 3 aza groups and one methine group is referred to as triaza porphine.

Another form of substitution involves substituting for one or more of the hydrogen atoms attached to the carbon atoms in the pyrrole rings of porphine. This can be substitution by an aliphatic or aromatic group, or can be orthofused polycyclic substitution as for example to form benzene or naphthalene ring structures. The compound having the common name 'phthalocyanine' contains 4 ortho-fused benzene rings, each substituted on a pyrrole ring of the porphine core; and also contains 4 aza groups substituted for the methine groups of the porphine core; it can therefore be designated tetrabenzo tetraaza porphine, and has the structure which follows. The numbers designate the positions of pyrrole substitution according to conventional nomenclature.

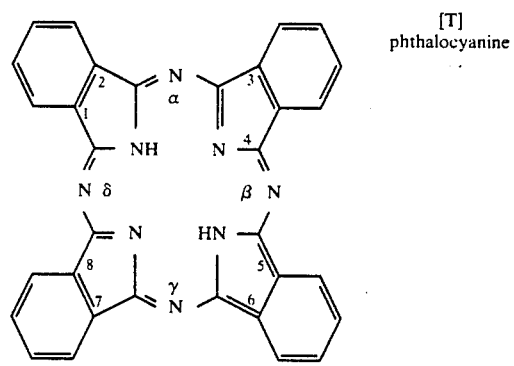

[T] phthalocyanine

Another form of substitution involves substituting for the hydrogen of the methine groups; this is conventionally referred to as meso substitution, and the positions of substitution are conventionally designated by Greek letters as illustrated on the phthalocyanine structure above.

Still another form of substitution is metallation by a heavy metal atom in a chelation structure: replacement of the two hydrogen atoms attached to two diagonally opposite inner nitrogen atoms of the four pyrrole groups by a heavy metal atom bonded to all four inner nitrogen atoms.

Still another form of substitution is substitution of a solubilizing group into the photoactivator molecule.

The various forms of substitution described above can be illustrated by the compound 3-phenyl-2,7-dicarboxyphenyl-α, γ-diaza-δ-benzofuryl-β-carboxybenzofuryl porphine zinc, trisodium salt, which is within the scope of this invention:

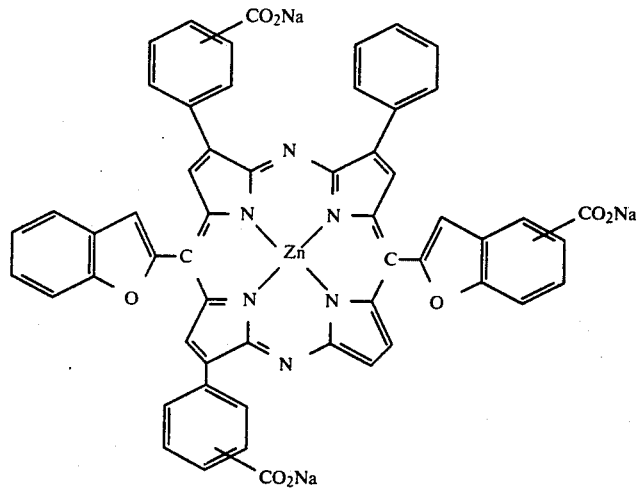

With the foregoing explanation as prelude, it is now possible to describe in detail the photoactivators of this invention. Referring to the structure shown hereinbefore in the SUMMARY OF THE INVENTION, effective photoactivators which are within the scope of this invention contain 0, 1, 2, 3 or 4 aza groups [and, according to the nomenclature defined above, contain 4, 3, 2, 1 or 0 methine groups, respectively].

The groups designated as R's in the structural formula above can, independently, be hydrogen or pyrrole substituted alkyl, cycloalkyl, aralkyl, aryl, alkaryl, or heteroaryl. Adjacent pairs of R's can also be joined together with ortho-arylene groups to form alicyclic or heterocyclic rings. Benzo substitution is especially preferred; i.e. $R_1$ and $R_2$, $R_3$ and $R_6$, and/or $R_7$ and $R_8$ are connected together pairwise by methylene groups to form fused benzene rings. Other preferred forms of pyrrole substitution are naphtho, pyrido, phenyl and naphthyl.

Substitutions can also be made for the hydrogen atoms of the methine groups of the photoactivators of this invention; thus each Y in the above structural formula can independently be hydrogen or meso substituted alkyl, cycloalkyl, aralkyl, aryl, alkaryl, or heteroaryl. It is preferred that Y is H, phenyl, naphthyl, thienyl, furyl, thioazyl, oxazyalyl, indolyl, benzothienyl, or pyridyl. No meso substitution at all or tetra phenyl meso substitution are especially preferred.

In the foregoing description, the term "alkyl" is defined to be not only a simple carbon chain but also a carbon chain interrupted by other chain-forming atoms, such as O, N or S. Non-limiting examples of such interruptions are those of the following groups:

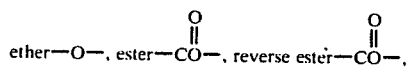

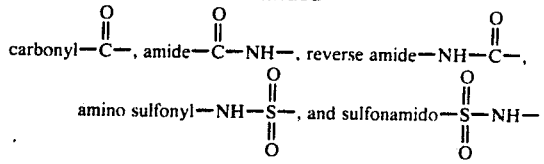

The photoactivating compounds of the instant invention can be unmetallated, A in the foregoing structural formula being comprised of two hydrogen atoms bonded to diagonally opposite inner nitrogen atoms of the pyrrole groups in the molecule [The characterictic structure of unmetallated compounds is illustrated by compounds [S] and [T] illustrated hereinbefore; these compounds are not, however, within the scope of this invention because they lack essential substituent groups as herein described.] Alternatively, the photoactivators of this invention can be metallated with zinc(II), calcium(II), cadmium(II), magnesium(II), scandium(III), aluminum(III), or tin(IV). Thus, altogether, A can be 2 (H) atoms bonded to diagonally opposite N atoms, or Zn(II), Ca(II), Cd(II), Mg(II), SC(III), Al(III), or Sn(IV). It is preferred that A be 2(H) or Zn(II).

Solubilizing groups can be located anywhere on the porphine molecule other than the porphine core as hereinbefore defined. Accordingly the solubilizing groups can be described as substituted into Y or R as hereinbefore defined.

Solubilizing groups can be anionic, nonionic, or cationic in nature. Preferred anionic solubilizing groups are carboxylate

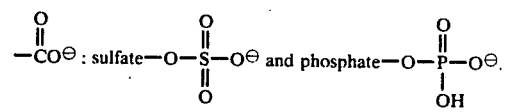

Another preferred anionic solubilizing group is

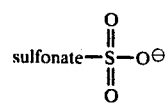

providing this group is attached to a carbon atom of the photoactivator molecule that is displaced more than 5 atoms away from the porphine core. Such a location is sometimes herein referred to as "remote", and is to be distinguished from an attachment to a carbon atom displaced no more than 5 atoms from the porphine core, which is sometimes referred to herein as "proximate". Other preferred anionic solubilizing agents are ethoxylated derivatives of the foregoing, especially the polyethoxysulfate group—$(CH_2CH_2O)_nSO_3^{\ominus}$ and the polyethoxy carboxylate group—$(CH_2CH_2O)_nCOO^{\ominus}$ where n is an integer from 1 to about 20.

For anionic solubilizing groups, M the counterion is any cation that confers water solubility to the porphine molecule. A monovalent cation is preferred, especially ammonium, ethanolammonium, or alkali metal. Sodium is most preferred. For reasons described hereinafter, for proximate solubilizing groups, the number of such groups per molecule, s, is from 3 to about 8, preferably from 3 to about 6, most preferably 3 or 4. For remote solubilizing groups, s is from 2 to about 8, preferably from 2 to about 6, most preferably 2 to 4.

Preferred nonionic solubilizing groups are polyethoxylates—$(CH_2CH_2O)_nH$. Defining s as the number of solubilizing groups per molecule, the number of condensed ethylene oxide molecules per porphine molecule is $N=sn$. The water soluble nonionic photoactivators of this invention have a value of N between about 8 and about 50, preferably from about 12 to about 40, most preferably from about 16 to about 30. Within that limitation the separate values of s and n are not critical.

For nonionic solubilizing groups, there is no counterion and accordingly M is numerically equal to zero.

Preferred cationic solubilizing groups are quaternary compounds such as quaternary aammonium salts

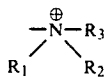

and quaternary pyridinium salts

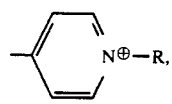

where all R's are alkyl or substituted alkyl groups.

For cationic solubilizing groups, M the counterion is any anion that confers water solubility to the porphine molecule. A monovalent anion is preferred, especially iodide, bromide, chloride or toluene sulfonate

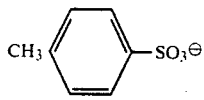

For reasons that are described hereinafter, the number of cationic solubilizing groups can be from 1 to about 8, preferably from about 2 to about 6, most preferably from 2 to 4.

Photoactivator usage in the compositions of this invention can be from about 0.005% to about 0.5% by weight of the composition. Preferable usage is from about 0.01% to about 0.1% by weight of the composition. The weight ratio of photoactivator to surfactant can be between about 1/10,000 and about 1/20, preferably between about 1/1000 and about 1/100.

Although it is not wished to be bound by theory, it is believed that the nature of this invention can be more clearly understood by postulating the mechanism of bleaching using the instant photoactivators. Referring to FIG. 1, the photoactivator in the upper left hand corner is in aqueous solution and is in its ground state. Reaction (1), entitled 'adsorption', indicates that dissolved photoactivator is in part adsorbed on fabrics. Reaction (2) suggests that photoactivator can dimerize into a form which is not readily adsorbed and therefore is not available to enter into the desired bleaching reactions on the fabric surfaces.

Reaction (3) illustrates that photoactivator in the ground state can be excited by visible light, $h\nu$, and thereby raised to the excited singlet state. From the excited singlet state the photoactivator can undergo intersystem crossing or ISC, reaction (4), to the triplet state which is also excited but at a lower energy level than the singlet state. It is the excited triplet state that is desired because it is capable of interacting with the ground state of atmospheric oxygen molecules, which are also in the triplet state, forming thereby according to reaction (5) the excited singlet state of oxygen and also regenerating photoactivator at its original ground state. Both the singlet and the triplet excited states of the photoactivator can enter into reactions other than the desired reaction with oxygen. For example, the singlet state can fluoresce, while the triplet state can phosphoresce, undergo radiationless decay, undergo electron transfer to photoactivator molecules in the ground state which results in deactivation of the photoactivator, or react with other components of the solution. From the standpoint of the desired bleaching these are collectively designated as reaction (6), 'side reactions'.

The excited singlet oxygen, formed by reaction (5), is the oxidative species that is capable of reacting with stains as shown in reaction (7) to chemically bleach them to a colorless and usually water-soluble state, thereby accomplishing the purpose of this invention.

It will be instructive to consider the effect upon bleaching brought about by the individual species of photoactivators that are within the scope of this invention. This will be done in reference to the seven reactions appearing on FIG. 1 which have been described above.

The number of aza groups substituted for methine groups in the porphine core primarily affects (a) the lifetime of the triplet state, and (b) the side reactions. The lifetime of the triplet state of metalloporphines [Grayushko et al, Opt. Spektrosk 31, page 548 (1971)] is substantially greater than that of corresponding metallophthalocyanines [Vincett et al, J. Chem. Physics 55, No. 8 page 4134, October 1971]. It is believed that introduction of each successive aza group shortens the lifetime, and it is apparent that a longer lifetime is desired to provide greater opportunity for reaction with oxygen molecules to form the active bleaching species. Hence from this point of view methine groups are preferred to aza groups. However a countervailing factor is that side reactions tend to be greatest when 4 methine groups are present, and decrease progressively as successive aza groups are introduced. The foregoing effects work in opposite directions, and accordingly it is not possible to predict the relative effectiveness of the different species based on theoretical considerations alone. As described hereinafter, porphines having 0, 1, 2, 3 and 4 aza groups are effective photoactivators, and the skilled artisan is free to select a photoactivator for reasons of cost, availability, and performance under specific conditions of interest to him.

This invention contemplates photoactivators that are metal free and also those that are metallated with certain metals. In general, the introduction of a metal atom into the photoactivator molecule causes a perturbation of the system which reduces the lifetime of the excited triplet states and increases side reactions, both of which are unwanted effects in relation to the instant invention. From this point of view unmetallated compounds are preferred photoactivators.

A countervailing factor is that manufacture of certain photoactivators is more readily accomplished when a metal is present to stablilize the molecule. This factor applies both to synthesis of a photoactivator compound by sulfonation of its unsulfonated precursor molecule, and also to synthesis of the precursor molecule itself.

Perturbation is especially great for metals which have unpaired electrons; hence paramagnetic metals are not satisfactory. Perturbation is also great for metals that are large in size. Data appearing in Vincett et al, op. cit., suggest that the lifetime of the triplet state of zinc phthalocyanine is hundreds of times longer than that of cooper phthalocyanine (Cu is paramagnetic) and approaches a hundred times longer than that of platinum phthalocyanine (Pt is large).

Metallated photoactivators that are acceptable in the practice of this invention are those containing relatively small, diagmagnetic metals: zinc(II), calcium(II), magnesium(II), scandium(III), aluminum(III), and tin(IV). Because the first six of these named metals have essentially constant valence, specific identification of their valence states will sometimes be omitted herein. Zinc is preferred because the triplet state of zinc metallated photoactivators is perturbed to a relatively low extent and hence its lifetime is relatively long.

All of the reactions described on FIG. 1 are predicated on solubility of the photoactivator in the laundry bath. Solubilization is accomplished by introducing solubilizing groups into the molecule. It is entirely practical to make compounds having respectively, one, two, three, four and even indeed up to as many as twelve solubilizing groups per molecule, and all are to some extent photoactivators. However as each successive solubilizing group is added, changes occur monotonically in a number of properties which affect usefulness, as explained below.

An anionic macrocyclic photoactivator molecule in solution is present in dissociated ionic form having negative charges around its periphery. The Coulombic effect of these negative charges is minimized by the counter ions in solution. The peripheral negative charges do, however, tend to localize the electron density of the ring near the center of the molecule and to enhance its basicity which leads to increased dimerization of the molecules as brought about by van der Waal forces [reaction 2, FIG. 1]. This circumstance is increased by multiple solubilizing groups and loss of symmetry, and hence the tendency to dimerize in solution follows the order mono$<$di$<$tetra$<$tri$<$penta . . . Dimerization being an undesirable reaction, a relatively small number of anionic solubilizing groups are preferred from this point of view.

On a cotton surface, which is negatively charged, multiple negative charges at the periphery of the molecule cause strong Coulombic repulsions which follow the order mono$<$di$<$tri$<$tetra$<$penta . . . Hence adsorption, which is desired, is greatest for species having a small number of anionic solubilizing groups. Furthermore the adsorption which does take place tends, for the species having a small number of anionic solubilizing groups, to be closer to the fabric surface which also is desired.

Still another advantage of a small number of anionic solubilizing groups is fewer side reactions of the triplet state.

However, once again there are countervailing factors. The Coulombic repulsions of species having a relatively high number of anionic solubilizing groups are widely distributed around the periphery of the adsorbed macrocyclic photoactivated moledule, which minimizes adsorption of successive layers of photoactivator on the fabric surface. However molecules of species having a small number of anionic solubilizing groups can geometrically orient in such a way as to minimize Coulombic repulsions and can build up multiple layers of photoactivator on the fabric surface. These multilayers are not desired: their intrinsic blue/green coloration becomes visible, and when irradiated by light they form singlet oxygen in a location sufficiently remote from the fabric surface that it is less effective for the desired stain removal. From these points of view desirability is in the order . . . $>$penta$>$tri$>$tetra$>$di$>$mono.

Still another advantage of a large number of anionic solubilizing groups is increased solubility in water.

Taking all the above into consideration it has been found that, for anionic photoactivators having proximate solubilizing groups, the negative factors of mono- and di- sulfonated photoactivator molecules are so important that these species are unsatisfactory, and hence photoactivators of this invention have three or more proximate solubilizing groups per molecule. Compounds having more than about eight proximate solubilizing groups per molecule are often difficult to make and have no particular advantage. Hence photoactivators of this invention having proximate solubilizing groups have from three to about eight such groups per molecule; compounds having three to six proximate solubilizing groups per molecule are preferred, and compounds having 3 or 4 proximate solubilizing groups per molecule are especially preferred as having an optimum balance of maximum bleaching effectiveness and minimum coloration.

The foregoing discussion relates to anionic photoactivators having proximate solubilizing groups. When the solubilizing groups are in remote locations, the tendency of the photoactivator molecule to aggregate is reduced because of both electrical and steric reasons, with the result that less dimerization occurs, less buildup on the fabric occurs, and the solubilizing effect of individual solubilizing groups is enhanced. Accordingly, a minimum of 2 remotely located anionic solubilizing groups per photoactivator molecule is satisfactory for the practice of this invention, with 2 to about 6 being preferred and 3 or 4 being especially preferred.

Nonionic solubilizing groups have a low tendency to aggregate because there is no electrical charge-density effect and there is a particularly large steric effect reducing orderly association between photoactivator molecules. Because solubilization of polyethoxylated photoactivator molecules occurs primarily because of numerous ether groups in the polyethoxylate chains, it is of little consequence whether there is a single very long chain or a number of shorter chains. Accordingly, the solubility requirement as hereinbefore expressed is in terms of the number of condensed ethylene oxide molecules per porphine molecule, which is from about 8 to about 50, preferably from about 12 to about 40, most preferably from about 16 to about 30.

Photoactivators having cationic solubilizing groups do not effectively aggregate at all because the electron density in the ring is reduced. Substantivity on cotton fabrics is great. Only one solubilizing group is enough to accomplish the purposes of this invention, although more are acceptable and indeed preferred. Accordingly the limiting numbers of solubilizing cationic groups are from 1 to about 8, preferably from about 2 to about 6, most preferably from 2 to 4.

As stated hereinabove, the macromolecular structure comprising the porphine core contributes the essential photoactivation properties of the compounds of this invention. It follows inexorably that large numbers of compounds having this macromolecular core, but with myriads of different substituent groups, are effective in the practice of this invention. One versed in the art will recognize the impracticability of reducing to writing all possibilities that can be envisioned by a skillful practitioner. The embodiments which follow are therefore to be considered exemplary but not exhaustive. Photoactivators that are effective bleaching agents for fabrics and are within the scope of this invention are the following:

Tetrabenzo - $\alpha, \beta, \gamma, \delta$, - tetrakis (4-N-ethyl) pyridyl prophine tetrachloride; tetrabenzo - $\alpha, \beta, \gamma, \delta$- tetrakis (N-trimethyl) aminoethyl porphine tetraiodide; tetrabenso - $\alpha, \beta, \gamma, \delta$- tetrakis (4-carboxyphenyl) prophine cadmium, tetrasodim salt; tetrabenzo - $\alpha, \beta, \gamma, \delta$- tetrakis (4-sulfatophenyl) porphine zinc, tetrapotassium salt; tetrabenzo - $\alpha, \beta, \gamma, \delta$- tetrakis (4sulfato polyethoxy phenyl) porphine, tetrasodium salt; tetra benzo - $\alpha, \beta, \gamma, \delta$- tetrakis (4-carboxy polyethoxy phenyl) porphine calcium, tetraamonium salt; tetrabenzo - $\alpha, \beta, \gamma, \delta$- tetrakis (4-phosphatophenyl) porphine, tetrapotassium salt; tetrabenzo - $\alpha, \beta, \gamma, \delta$- tetrakis (4phosphato polyethoxy phenyl) porphine zinc, tetra(mono-ethanolamine) salt; trans-dichloro, tetrabenzo - $\alpha, \beta, \gamma, \delta$-tetrakis (4-polyethoxy phenyl) porphine tin (IV).

Tetrakis (N-methyl) pyrido porphine zinc tetraiodide; tetrakis (N-trimethyl)- aminobenzo porphine, tetra (toluene sulfonate) salt; trans-dibromo, tetrakis (carboxybenzo) porphine tin(IV), tetra(diethanolamine) salt; tetrakis (sulfato benzo) porphine zinc, tetrasodium salt; chloro, tetrakis (sulfato polyethoxy benzo) porphine scandium, tetrammonium salt; tatrakis (carboxy polyethoxy benzo) porphine, tetrasodium salt; tetrakis (phosphato benzo) porphine zinc, tetralithium salt; tetrakis (phosphato polyethoxy benzo) porphine, tetra(triethanolamine) salt; tetrakis (polyethoxy benzo) porphine; tetrabenzo - $\alpha, \beta, \gamma, \delta$- tetrakis - (4-carboxyphenyl) porphine zinc, tetrasodium salt.

Tetranaphtho - $\alpha, \beta, \gamma, \delta$- tetrakis - (4-phosphato polyethoxy phenyl) porphine, tetrasodium salt; tetrakis (N-methyl) pyrido - $\alpha, \beta, \gamma, \delta$- tetranaphythyl porphine tetrachloride; chloro, tetrakis (polyethoxy naphtho) -$\alpha, \beta, \gamma, \delta$-tetra phenyl porphine aluminum tetrakis (N-diethyl-N-propyl) -aminobenzo - $\alpha, \beta, \gamma, \delta$- tetrakis (4-N-methyl) pyridyl porphine magnesium, octabromide; tetrakis (carboxynaphtho) -$\alpha, \beta, \gamma, \delta$- tetrakis (4-carboxy phenyl) porphine zinc, octa potassium salt; tetrakis (polyethoxy benzo) - $\alpha, \beta, \gamma, \delta$- tetrakis (polyethoxy phenyl) porphine; transdichloro, 1, 3, 5, 7 - tetrakis (carboxy phenyl) - $\alpha, \beta, \gamma, \delta$- tetrakis (polyethoxy phenyl) porphine tin(IV), tetra ammonium salt; 1, 3, 5, 7 - tetrakis (sulfato polyethoxy phenyl) - $\alpha, \beta, \gamma, \delta$- tetrakis (carboxy naphthyl) porphine cadmium, octa di(ethanolamine) salt; 1, 3, 5, 7 - tetrakis (phosphato phenyl) - $\alpha, \beta, \gamma, \delta$- tetrakis (4-N-methyl) pyridyl porphine zinc, tetra sodium salt tetra chloride; 1, 3, 5, 7 - tetrakis (N-trimethyl) aminobutyl $\alpha, \beta, \gamma, \delta$- tetrakis polyethoxy phenyl porphine, tetraiodide.

1, 3, 5, 7 - tetrakis (4-carboxy phenyl) - $\alpha, \beta, \gamma, \delta$- tetrakis - (4-carboxy phenyl) porphine, octasodium salt; 1, 3, 4, 6 - tetrakis (carboxyethyl) - $\alpha, \beta, \gamma, \delta$- tetrakis - (4-carboxy naphthyl) porphine, octasodium salt; 1, 2, 3, 4 - tetrakis (phosphato phenyl) - $\alpha, \beta, \gamma, \delta$- tetra phenyl porphine zinc, tetra(monethanolamine) salt; 2, 3, 6, 7 - tetrakis (sulfatoethyl)-$\alpha, \beta, \gamma, \delta$- tetra anthracyl porphine, tetrammonium salt; dibenzo-$\alpha, \beta, \gamma, \delta$- tetrakis-(4-N-ethyl) pyridyl porphine cadmium tetraiodide; dinaphtho - $\alpha, \beta, \gamma, \delta$- tetrakis - (4-carboxy phenyl) porphine, tetrapotassium salt; di(N-triethyl)- aminobenzo - $\alpha, \beta, \gamma, \delta$- tetrakis - (N-triethyl aminomethyl porphine zinc hexabromide; transdibromo, di(sulfatobenzo) - $\alpha, \beta, \gamma, \delta$- tetrakis - (sulfatobenzo) porphine tin (IV), hexasodium salt; chloro, 1, 3, 5, 7 - tetrakis (sulfato phenyl) - $\alpha, \beta$- di(sulfato phenyl) porphine scandium, hexaamonium salt; 1, 3, 5, 7 - tetrakis (polyethoxy phenyl) - $\alpha, \beta$- di(polyethoxy phenyl) porphine magnesium.

Tetrakis - (carboxy benzo) - $\alpha, \beta, \gamma$- tri(4-carboxy phenyl) porphine, heptasodium salt; tetrakis (phosphato benzo) - $\alpha$- mono(phosphato phenyl) porphine, pentapotassium salt; 1, 5 - di(polyethoxy phenyl) -$\alpha, \beta, \gamma, \delta$- tetrakis (polyethoxy phenyl) porphine; 1 - mono (4-carboxy phenyl) - $\alpha, \beta, \gamma, \delta$- tetrakis (4-carboxy phenyl) porphine, pentasodium salt; 1, 3, 5, -tri(sulfato phenyl) - $\alpha, \beta, \gamma, \delta$, - tetrakis (sulfato phenyl) porphine zinc, heptasodium salt; 1, 5 - di(carboxy phenyl) - $\alpha, \beta$- di(carboxy phenyl) porphine, tetrasodium salt; 1, 3 - di(phosphato phenyl) - $\alpha, \beta, \gamma$- tri (phosphato phenyl) porphine, pentasodium salt; mono(carboxybenzo) - $\alpha, \beta, \gamma$- tri (4-carboxy phenyl) porphine, tetrasodium salt; tetrakis - (carboxybenzo) - $\alpha, \beta, \gamma, \delta$- tetrakis (2-furyl) - porphine zinc, tetrasodium salt; tetrakis - (dicarboxybenzo) - $\alpha, \beta, \gamma$- tri(4-pyridyl) - porphine, octasodium salt;

1, 2, 3, 4, 5, 6, 7, 8 - octa - (4-N-ethyl pyridyl) - $\alpha, \gamma$- di(2-thioazyl) - porphine octaiodide; 1, 2, 3, 4, 5, 6, 7, 8 - octa - (4-sulfato phenyl) - $\alpha$- (2-oxazolyl) - porphine, octasodium salt; 1, 2, 3, 4, 5, 6, 7, 8 - octa -(4-polyethoxy phenyl) - $\alpha, \beta$- di(2-indolyl) - porphine; 1, 2, 5, 6 - tetrakis - (4-carboxy polyethoxy phenyl) - $\alpha, \beta, \gamma, \delta$- tetrakis (methoxy phenyl) - porphine, tetrasodium salt; 1, 3, 5, 7 - tetrakis - (4-carboxy phenyl) - $\alpha, \beta, \gamma, \delta$- tetrakis (2-benzo thienyl) - porphine, tetrasodium salt; tetrakis (N-methyl pyrido) - $\alpha, \beta, \gamma, \delta$- tetraaza porphine tetraiodide; 1, 3, 5, 7 - tetrakis (N-trimethyl pyridyl) - $\alpha, \beta, \gamma, \delta$- tetraaza porphine zinc tetrachloride; tetrakis (N-methyl pyrido) - $\alpha$- (N-methyl pyrido) - $\beta, \gamma, \delta$- triaza porphine cadmium pentaiodide; chloro, tetrakis (carboxybenzo) - $\alpha, \beta$- di(4-carboxy phenyl) - $\gamma, \delta$- diaza porphine aluminum hexasodium salt; trans-dichloro, di(polyethoxybenzo) - $\alpha, \gamma$- di(polyethoxymethyl)- $\beta, \delta$-diaza porphine tin (IV).

Di(sulfatobenzo) - $\alpha, \beta, \gamma$- tri(sulfato phenyl) - $\delta$-monoaza porphine calcium, penta-sodium salt; tetrakis (phosphato benzo)- $\alpha$- mono naphthyl - $\beta, \gamma, \delta$- triaza porphine tetrasodium salt; mono (N-trimethyl amino ethyl benzo) - $\alpha, \beta, \gamma, \delta$- tetraaza porphine monoiodide;

tribenzo - α(polyethoxy phenyl) - β, γ, δ- triaza porphine; 1, 3 - di (polyethoxy ethyl) -α, β, γ, δ- tetrakis (2-oxazolyl) porphine; di(N-methyl pyridyl benzo) -dibenzo - α, β, γ, δ- tetraaza porphine dibromide; tetrasulfobenzo - α, β, γ, δ- tetrakis (5-sulfophenyl-n-amyl) porphine zinc, octasodium salt; 1,5 - di(6-sulfophenyl-n-hexyl) - α, β, γ, δ- tetrakis (sulfo-2furyl) porphine, hexaammonium salt; α, β,γ, δ- tetrakis (dicarboxyethyl)-phenyl(aminosulfonyl phenyl) porphine, octapotassium salt.

Each of the foregoing illustrative photoactivators is a specific chemical compound. It should be understood that alternative photoactivators, each within the scope of the instant invention, are those wherein substituted in each specific named compound are, inter alia:

(a) instead of a specific cation listed: sodium, potassium, lithium, ammonium, monoethanolamine, diethanolamine, or triethanolamine salts.

(b) instead of a specific anion listed: chloride, bromide, iodide, or toluene sulfonate salts.

(c) instead of the metallation listed: zinc(II), calcium(II), cadmium(II), magnesium(II), scandium(III), aluminum(III), tin(IV), or metal free.

(d) instead of the specific alkyl groups mentioned: methyl, ethyl, n-propyl, isopropyl, n-butyl, isobutyl, sec-butyl, or tertbutyl.

(e) instead of the specific solubilizing group mentioned: carboxylate, polyethoxy carboxylate, sulfate, polyethoxy sulfate, phosphate, polyethoxy phosphate, remote sulfonate, quaternary pyridinium, quaternary ammonium, or polyethoxylate.

(f) instead of the number of solubilizing groups mentioned: any number of solubilizing groups that is not greater than the number of pyrrole-substituted aromatic or pyrido groups plus the number of mesosubstituted aromatic or heterocyclic groups and that is, for cationic or nonionic solubilizing groups, from 1 to 8 ; for remote anionic solubilizing groups, from 2 to 8 ; and for non-remote solubilizing groups, from 3 to 8.

(g) instead of the specific pyrrole substituents mentioned: benzo, naphtho, pyrido, phenyl or naphthyl.

(h) instead of the specific meso substituents mentioned: phenyl, naphthyl, thienyl, furyl, thioazyl, oxazyalyl, indolyl, benzothienyl, or pyridyl.

The alternative photoactivator compounds described above are to be considered equally illustrative of the compounds of this invention as the compounds specifically named in the preceding list.

Additional embodiments of this invention are compounds hereinafter appearing numbered from II through XIII and from XXIV through XXXVIII, as well as compounds numbered from XIV through XXIII following conversion of hydroxy groups to corresponding carboxy groups.

The literature contains references to numerous means of preparation of porphine and its derivatives, i.e. to the photoactivators of this invention. One skilled in the art of porphine or phthalocyanine chemistry will have no difficulty selecting a synthesis appropriate for his particular purposes. Some of the synthesis reactions are accompanied by side reactions; in these cases conventional means of separation and purification are needed, such as chromatographic techniques, in a manner also detailed in the literature and well known to the skilled practitioner.

One convenient way to prepare porphines is to react substituted or unsubstituted heterocyclic or aromatic carboxaldehydes with substituted or unsubstituted pyrroles. By varying the substituent groups of one or the other or both of these reactants, a great variety of porphine derivatives can be obtained. For example,

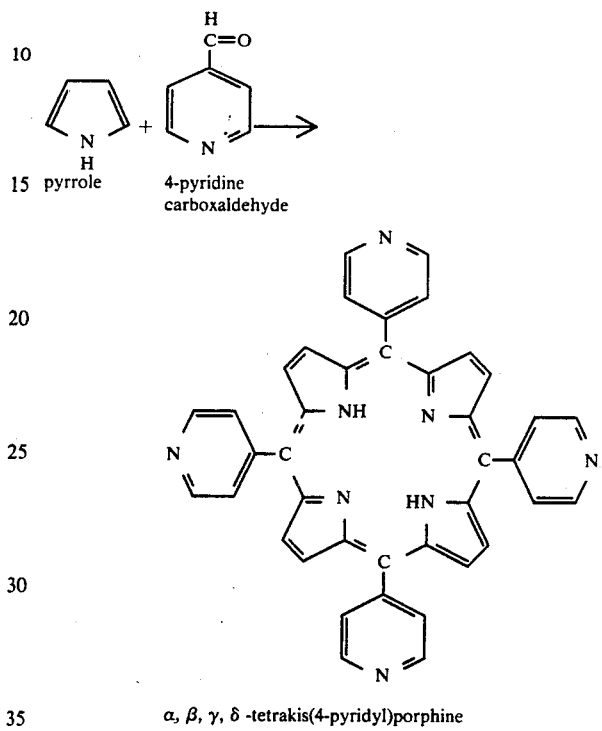

α, β, γ, δ -tetrakis(4-pyridyl)porphine

The stability of the quadridentate macromolecular structure is such that the reaction proceeds as described above. For convenience, the product is frequently and conventionally described by showing only one quarter of this symmetrical structure. It will be appreciated this structure is stabilized by resonance, and the bonds of all four quarters of the structure are alike, even though conventionally they are drawn in just one of the resonating structures. Accordingly, compound (I) above can be illustrated more simply as:

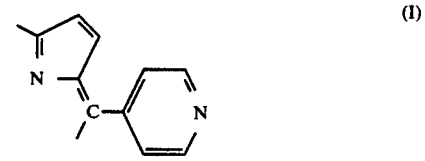

(I)

When compound (I), a substituted pyridine, is reacted with an alkyl halide such as $CH_3I$, a quaternary pyridinium salt is formed which is an effective photoactivating bleach of this invention providing the other requirements are met as set forth herein. Quaternary porphine derivatives adsorb especially strongly upon cotton fabrics because of their opposite charge. This is desirable; however a countervailing factor is the yellowish color of many such compounds which tends to remain on the fabric after washing.

The methyl ester of toluene sulfonate may be used instead of methyl iodide as a quaternizing salt, leading to the following synthesis:

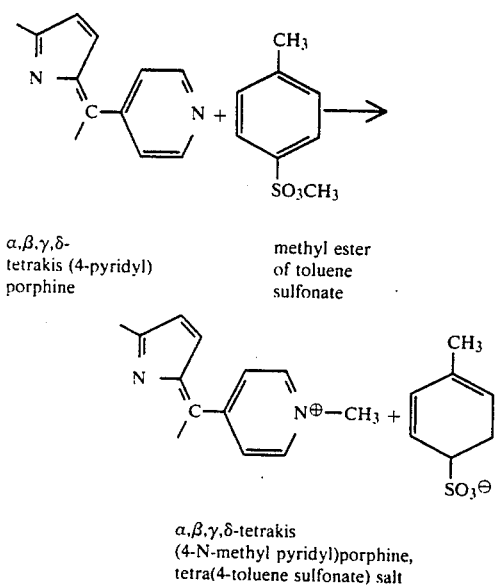

α,β,γ,δ-tetrakis (4-pyridyl) porphine + methyl ester of toluene sulfonate → (I)

α,β,γ,δ-tetrakis (4-N-methyl pyridyl)porphine, tetra(4-toluene sulfonate) salt (II)

When substituted pyrroles are reacted with pyridine 4-carboxyaldehyde, and the reaction product reacted with an alkyl halide, a number of different pyridinium salts are formed. Non-limiting examples are:

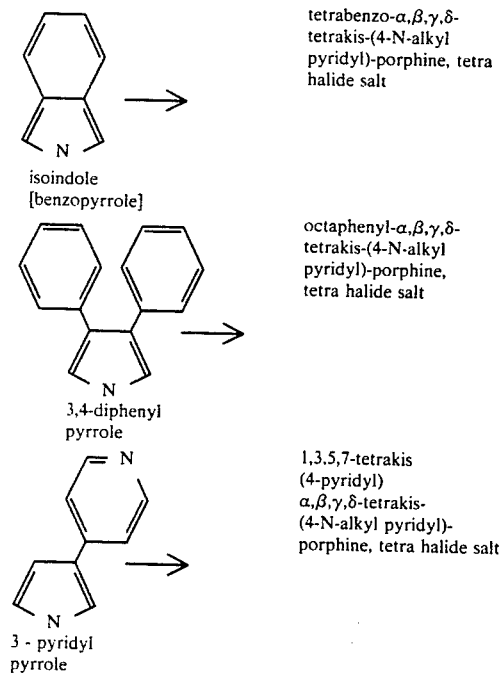

isoindole [benzopyrrole] → tetrabenzo-α,β,γ,δ-tetrakis-(4-N-alkyl pyridyl)-porphine, tetra halide salt (III)

3,4-diphenyl pyrrole → octaphenyl-α,β,γ,δ-tetrakis-(4-N-alkyl pyridyl)-porphine, tetra halide salt (IV)

3-pyridyl pyrrole → 1,3,5,7-tetrakis (4-pyridyl) α,β,γ,δ-tetrakis-(4-N-alkyl pyridyl)-porphine, tetra halide salt (V)

The above class of reactions between substituted pyrroles and pyridine 4-carboxaldehyde can be carried out by refluxing in isopropionic acid for about 30 to 60 minutes followed by chromatographic purification. This method is described by Adler in J. Organic Chemistry, 32, p. 476 (1967) which is herein incorporated by reference.

Any of the resultant metal-free compounds illustrated by compounds (II) through (V) above can be converted to the corresponding metallated compound by heating with a metal salt of Zn(II), Ca(II), Cd(II), Mg(II), SC(III), Al(III) or Sn(II) in an appropriate solvent. [The Sn(II) becomes oxidized in the process, such that the photoactivator is metallated by Sn(IV)]. For example, heating α, β, γ, δ- tetrakis (4-pyridyl) porphine in dimethylformamide in the presence of zinc acetate yields α, β, γ, δ- tetrakis (4-pyridyl) porphine zinc. This method is described by Adler in J. Inorganic Nuclear Chemistry, volume 32, pages 2443–5 (Pergamon Press Inc., Great Britain, 1970) which is herein incorporated by reference.

Alternatively, a metallated derivative can be prepared by carrying out the synthesis reaction in the presence of a salt of the desired metal. For example, if cadmium chloride is present while carrying out reaction (IV), the resultant photoactivator compound is 1, 2, 3, 4, 5, 6, 7, 8 - octaphenyl α, β, γ, δ- tetrakis - (4-N alkyl pyridyl) porphine cadmium, tetrahalide salt. This reaction for producing a metallated compound may be preferred because the presence of the metal tends to increase stability of the desired quadridentate structure and tends to minimize the formation of other reaction products.

The metallation processes described above are generally applicable to the photoactivators of this invention, whatever the solubilizing groups may be.

Aza pyridinium salts can be made by condensing and rearranging pyrido-substituted imides or dinitriles, or by condensing and rearranging pyrido-substituted aromatic vicinal dicarboxylic acids in the presence of ammonia. Molybdic or tungstic acid or metallic antimony can be employed, if desired, to accelerate the reactions. For example.

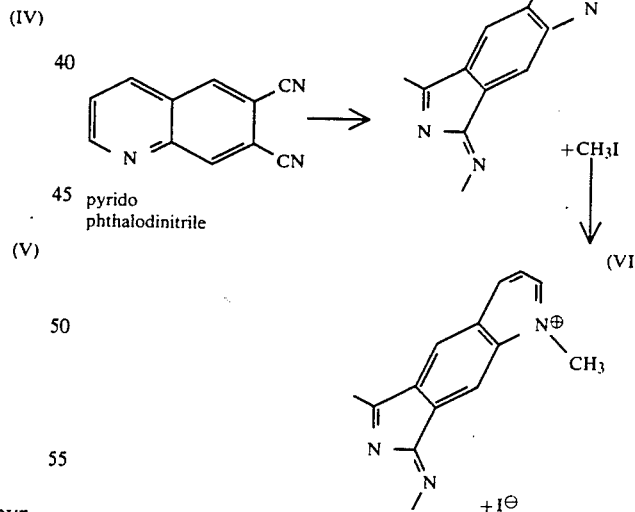

pyrido phthalodinitrile → +CH₃I ↓ (VI)

tetrakis (N-methyl-6,7-quinolinedyl)-tetraaza porphine, tetraiodide salt

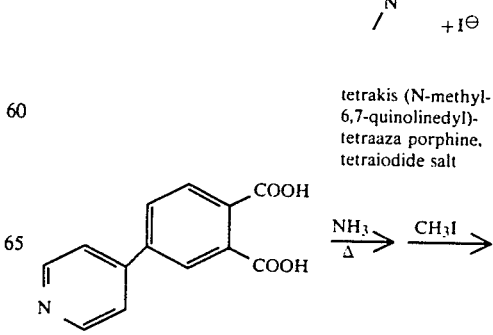

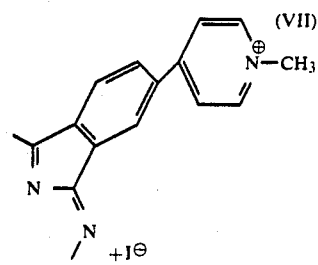

tetrakis
(N-methyl pyridyl benzo)
tetraaza porphine,
tetraiodide salt

Mono-, di-, and tri-aza pyridinium salts can be prepared by using mixtures of starting materials which yield mixtures of reaction products according to the proportions of the reactants. If pure species are desired, they can be purified by chromatographic techniques. Non-limiting examples are:

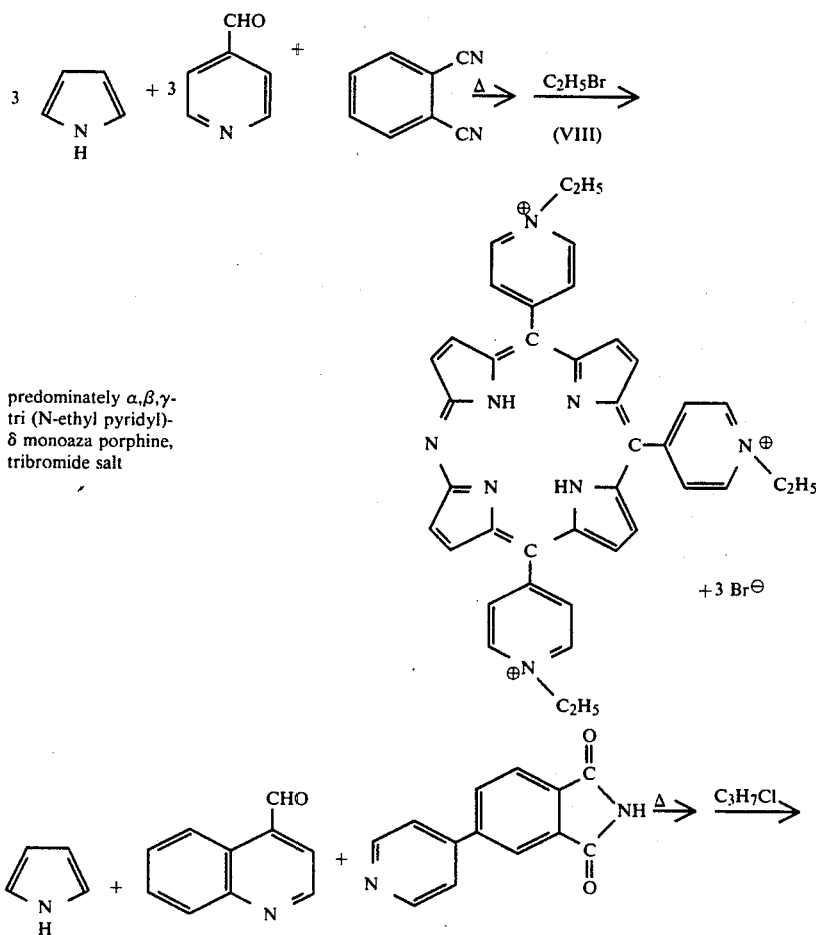

predominately α,β,γ-tri (N-ethyl pyridyl)-δ monoaza porphine, tribromide salt predominately 2,6-dimethyl-3,4,7,8-di(N-propyl pyridyl benzo)-α,γ-di(benzo-N-propyl pyridyl)-β,δ-diaza porphine, tetrachloride salt

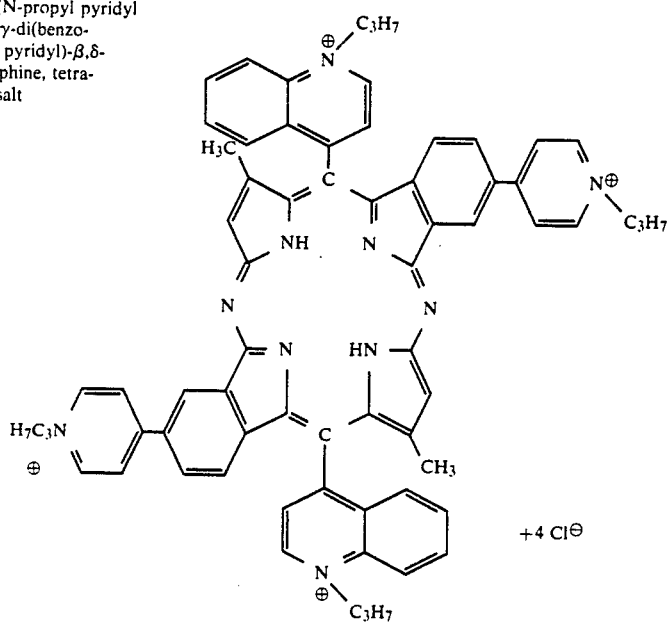

+4 Cl⊖

By suitable changes in starting materials, quaternary ammonium salts can be prepared in a manner similar to that of the pyridinium salt illustrated as compound (II). For example, reacting pyrrole with a tertiary amino aldehyde, followed by quaternizing, leads to

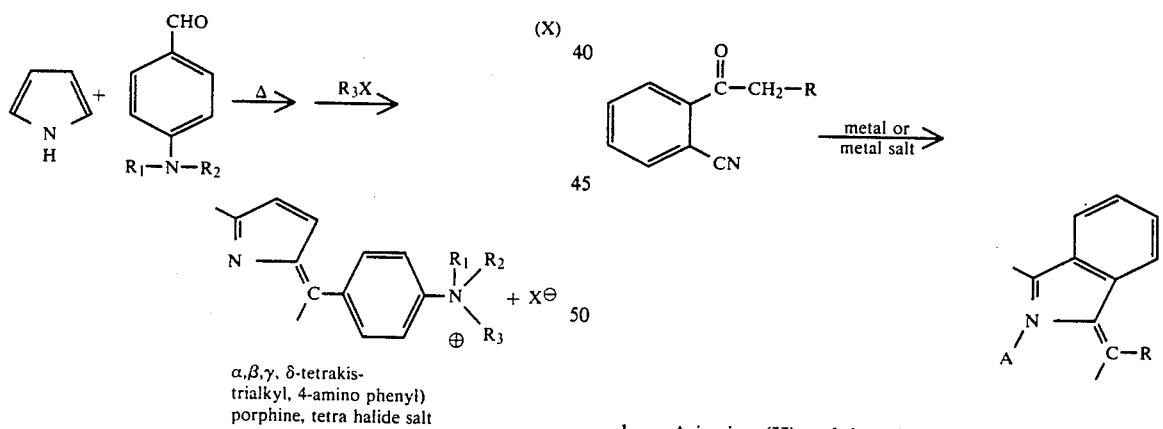

α,β,γ,δ-tetrakis-trialkyl, 4-amino phenyl) porphine, tetra halide salt

As before, use of substituted pyrroles leads to pyrrole-substituted porphines, while variations in the tertiary amino group lead to corresponding variations in the meso substitution.

A completely different route to porphine compounds having fused ring substitution on the pyrrole rings is the condensation of rearrangement of 4 molecules of cyano aromatic or cyano heterocyclic ketones to form a quadridentate structure. This is done by heating in the presence of metallic zinc, calcium, cadmium, magnesium, scandium, aluminum or tin, or a metal salt of Zn(II), Ca(II), Cd(II), Mg(II), Sc(III), Al(III), or Sn(II), and yields the corresponding metallated porphine.

where A is zinc (II), calcium (II), cadmium (II), magnesium (II), scandium (III), aluminum (III) or tin (IV) and where R is hydrogen or substituted or unsubstituted alkyl, aryl, or mixtures thereof. To utilize this method to make quaternary ammonium salts it is only necessary to start with a compound having a tertiary amino group in the R moiety, and then quaternize the resultant porphine as before. For example,

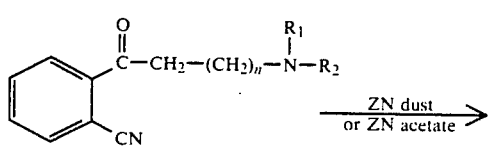

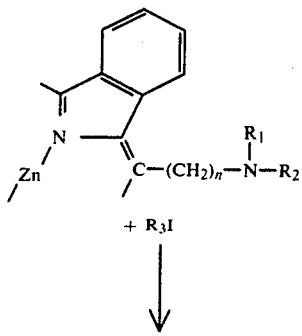

+ R₃I
↓

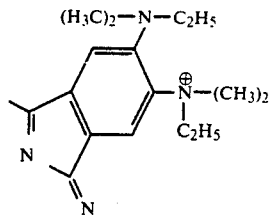

tetrakis-di-(N-dimethyl-
N-ethylamino) benzo - α, β,
γ, δ, - tetraaza porphine,
octaiodide salt Quaternary ammonium mono-, di-, and tri-aza porphines can be made by suitable choice of mixed starting materials, in a manner analagous to the way analagous pyridinium compounds can be made as explained hereinabove. Mixed quaternary ammonium/pyridinium porphine compounds are readily prepared, as for example:

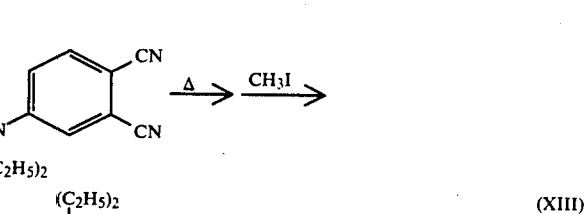

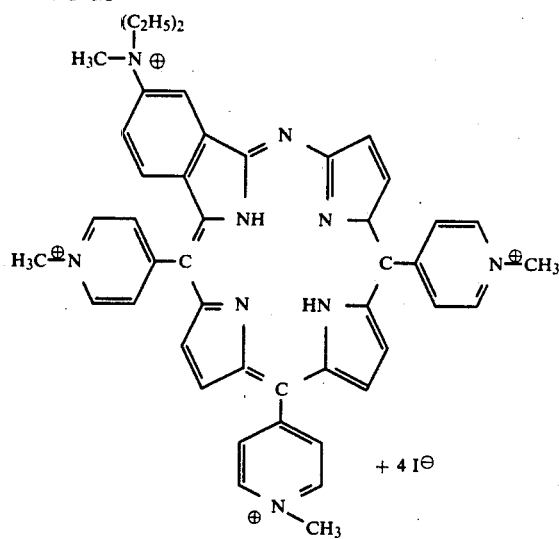 (XIII)

predominately
2-(N-diethyl-N-
methyl amino
benzo)-β, γ, δ-
tri(N-methyl
pyridyl)-α-
monoaza porphine,
tetra iodide salt

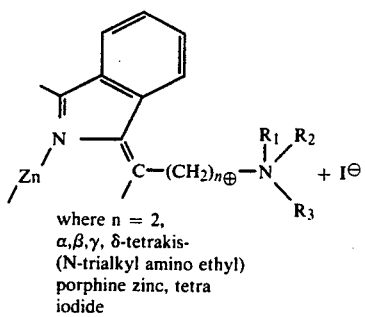

where n = 2,
α,β,γ, δ-tetrakis-
(N-trialkyl amino ethyl)
porphine zinc, tetra
iodide Quaternary ammonium aza porphines can be made by adaptation of the methods of equations VI and VII supra, as for example:

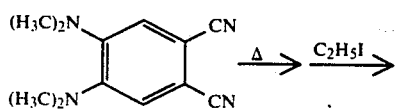 (XII)

Among the preferred nonionic and anionic solubilizing groups of the photoactivators of this invention and polyethoxylates, sulfates, polyethoxysulfates, carboxylates, polyethoxy carboxylates, and phosphates. A suitable preparative method for introducing all such groups into the porphine structure is to first make the corresponding polyhydroxy porphine, and then convert the hydroxy groups to the solubilizing groups of choice. Accordingly, methods of preparing hydroxy porphines will be described below, following which means of converting these compounds to polyethoxylates, sulfates, etc. will be discussed.

One method of making polyhydroxy porphines is the reaction of pyrrole and substituted pyrroles with hydroxy-substituted aromatic aldehydes. This is analogous to the preparation of cationic solubilizing groups illustrated by compounds (II), (III), (IV), (V) and (X) supra. For example,

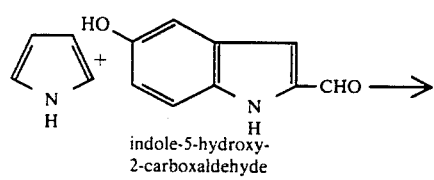
indole-5-hydroxy-2-carboxaldehyde (XIV)

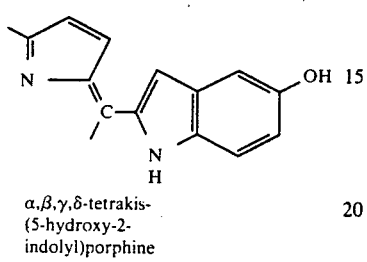
α,β,γ,δ-tetrakis-(5-hydroxy-2-indolyl)porphine

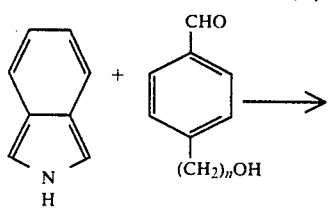
(XV)

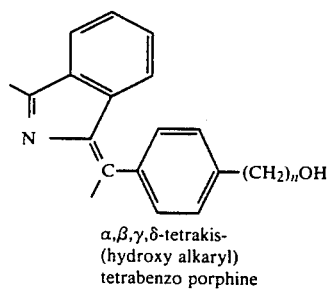
α,β,γ,δ-tetrakis-(hydroxy alkaryl) tetrabenzo porphine

Mixtures of the above starting materials yield porphine structures wherein the 4 quarters of the quadridentate molecules have non-identical structures, according to the proportions used. This method of preparation can be exemplified by the use of a mixture of pyrrole and benzopyrrole with benzaldehyde to yield dibenzo meso tetraphenyl porphine.

Alternatively, hydroxy-substituted pyrroles can be reacted with aromatic aldehydes:

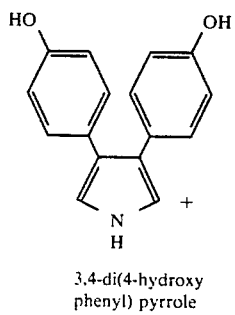
3,4-di(4-hydroxy phenyl) pyrrole (XVI)

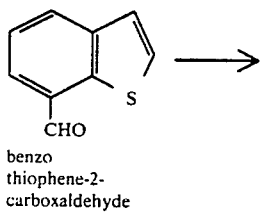
benzo thiophene-2-carboxaldehyde

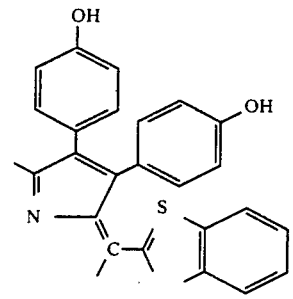
1,2,3,4,5,6,7,8-octa(hydroxy phenyl)-α,β,γ,δ-tetrakis (2-benzothienyl) porphine (XVII)

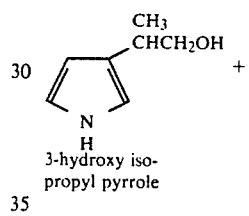
3-hydroxy isopropyl pyrrole

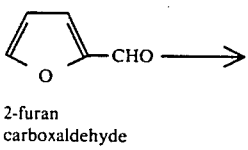
2-furan carboxaldehyde

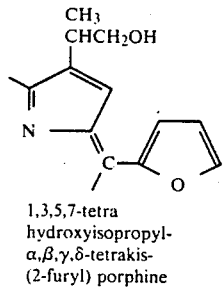
1,3,5,7-tetra hydroxyisopropyl-α,β,γ,δ-tetrakis-(2-furyl) porphine

In a manner analogous to the preparation of cationic compound (XI), hydroxy cyano aromatic or hydroxy cyano heterocyclic ketones can be condensed and rearranged to form the stable porphine quadridentate structure. For example:

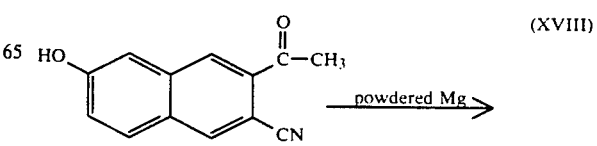
(XVIII)

-continued

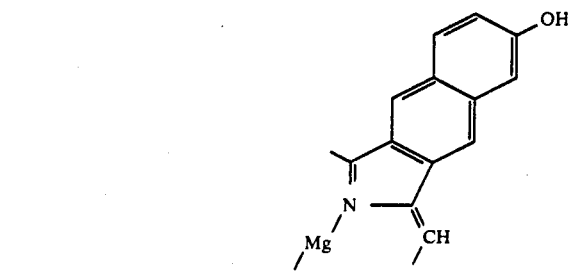

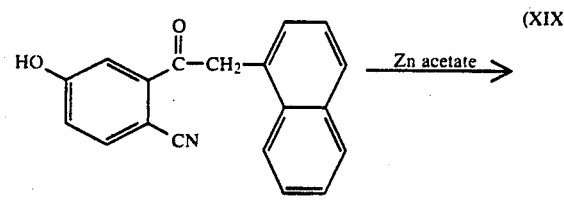
(XIX)

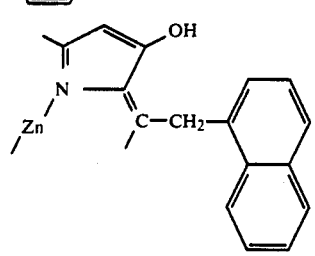

Mixtures of the above starting materials yield porphine structures wherein the 4 quarters of the quadridentate molecules have non-identical structures, according to the proportions used.

Hydroxy-substituted aza porphines can be made in a manner analogous to that used to prepare compounds (VI) and (VII); i.e. by condensation and rearrangement of hydroxy-substituted aromatic vicinal dicarboxylic acids in the presence of ammonia. For example:

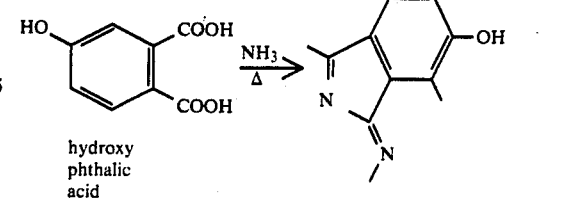
(XXI)

hydroxy phthalic acid

A mixture of polyhydroxy mono- and di-aza porphines results from using, as starting materials, a mixture of a metal cyanide with a ketone whose two side groups are, respectively, (alkyl or aryl) and (halo aryl or halo heterocyclic), where one or the other or both side groups of the ketone have a hydroxyl group substituted therein. For example, (XXII)

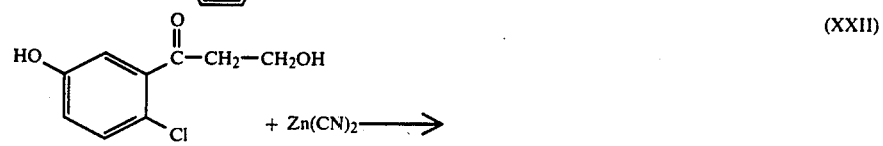

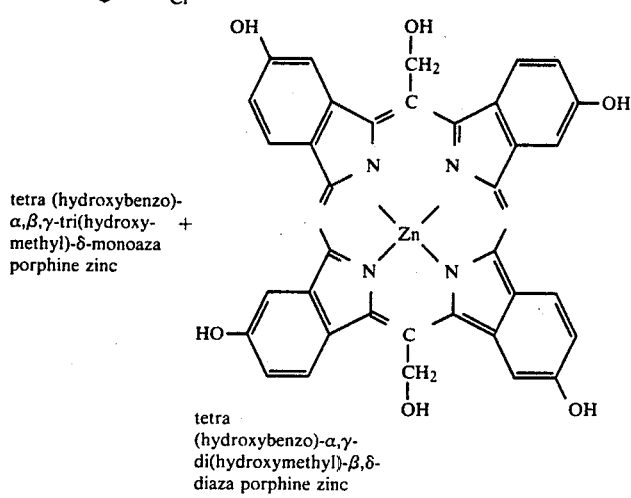

tetra (hydroxybenzo)-α,β,γ-tri(hydroxy-methyl)-δ-monoaza porphine zinc tetra (hydroxybenzo)-α,γ-di(hydroxymethyl)-β,δ-diaza porphine zinc

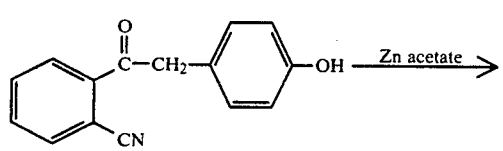

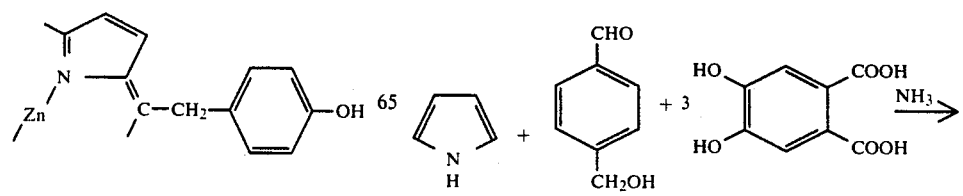

Alternatively, using mixtures of starting materials described above:

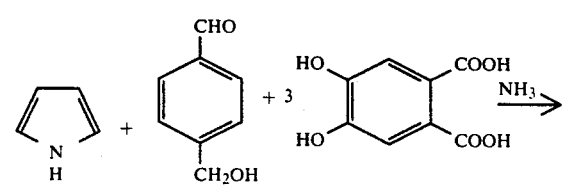

-continued

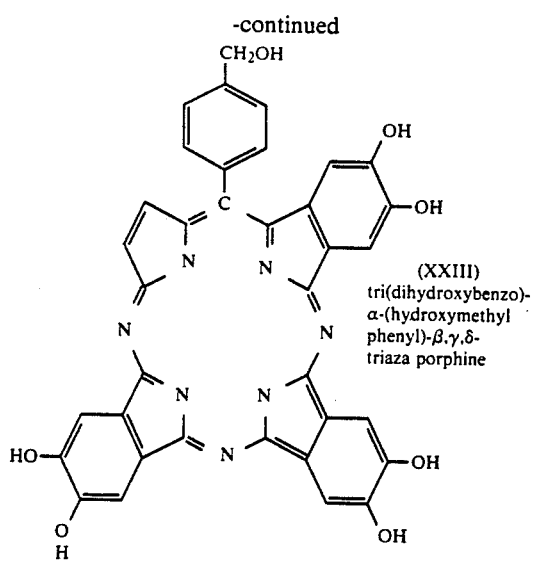

(XXIII) tri(dihydroxybenzo)-α-(hydroxymethyl phenyl)-β,γ,δ-triaza porphine

The hydroxy groups of the foregoing hydroxy substituted porphines can be converted to solubilizing groups of this invention according to the following well known chemical reaction procedures:

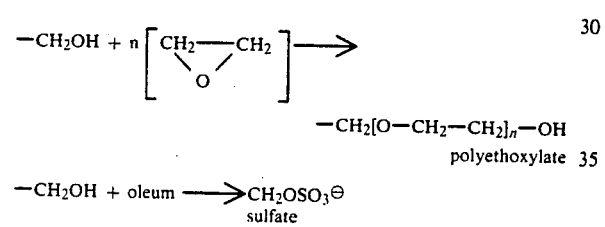
polyethoxylate

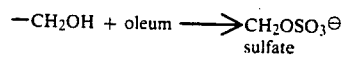
sulfate

$-CH_2(OCH_2CH_2)_nOSO_3^\ominus$
polyethoxysulfate

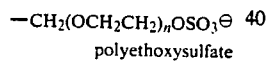
carboxylate

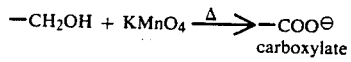
methoxy carboxylate

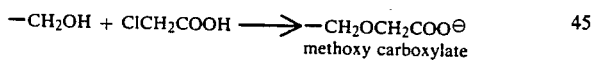

$-CH_2(OCH_2CH_2)_{n-1}OCH_2COO^\ominus$
polyethoxy carboxylate

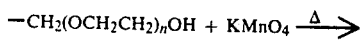

$-CH_2(OCH_2CH_2)_nOCH_2COO^\ominus$
polyethoxy carboxylate

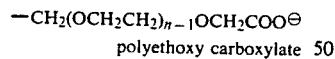
phosphate

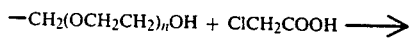

$-CH_2(OCH_2CH_2)_nOPOO^\ominus$
          $|$
          OH
polyethoxy phosphate

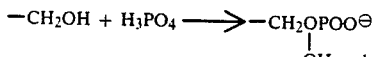
$-CO(OCH_2CH_2)_nOH$
polyethoxylate ester

To exemplify how these procedures can be used:

-continued

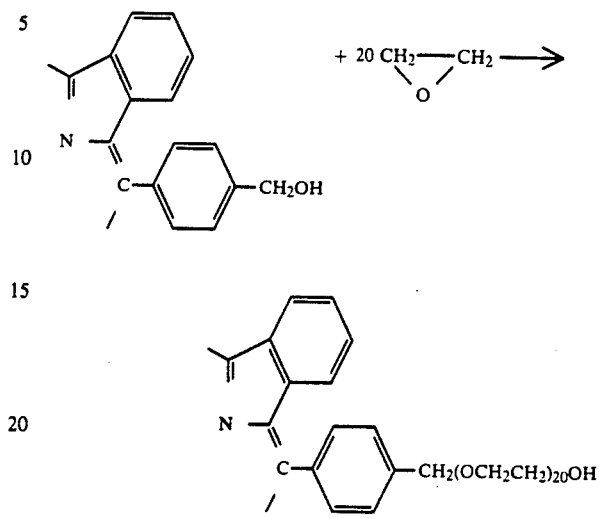

tetrabenzo-α,β,γ,δ-tetra(4-polyethoxymethyl-phenyl) porphine

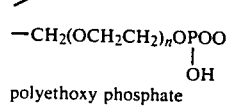

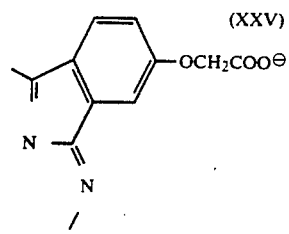

(XXV) 2,4,6,8-tetrakis (carboxy methoxy)-α,β,γ,δ,-tetraaza porphine

It will be appreciated that one skilled in the chemical arts, and particularly in the color and dye arts, can apply the foregoing principles to make his photoactivator of choice according to this invention.

Alternative ways of making carboxy porphines are evident modifications of the chemistry hereinbefore described:

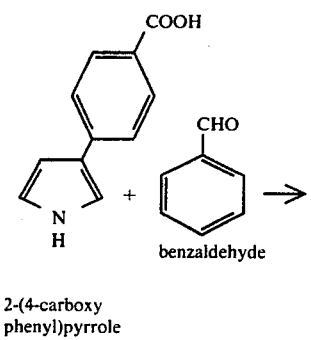 

(XXVI)

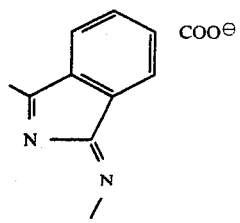

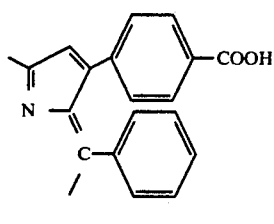

α,β,γ,δ - tetraphenyl-1,3,5,7 tetra(4-carboxyphenyl) porphine

Varying proportions of the above starting materials in mixtures yield mono-, di-, and tri-aza compounds. For example:

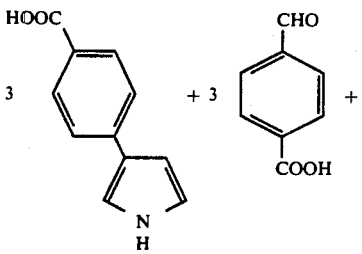
(XXX)

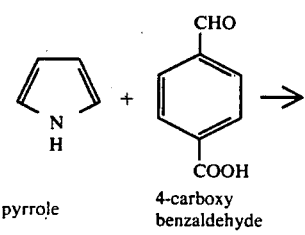
(XXVII)

pyrrole  4-carboxy benzaldehyde

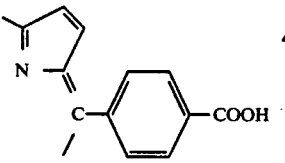

α,β,γ,δ - tetrakis (4-carboxyphenyl) porphine

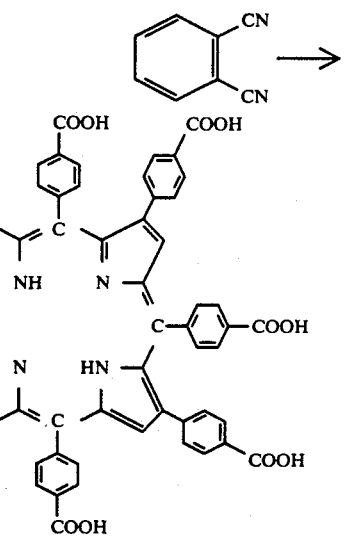

predominately
1,3,5-tri(4-carboxyphenyl)-α,β,γ-tri(4-carboxyphenyl)-δ-aza-porphine

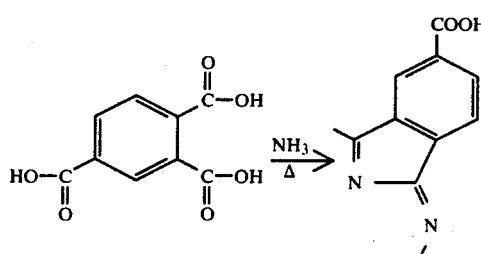
(XXVIII)

Using mixtures of starting materials which have different solubilizing groups, followed by appropriate sequential reaction, yields corresponding porphine derivatives, which may be entirely anionic, entirely nonionic, or may be zwitterionic in nature. For example:

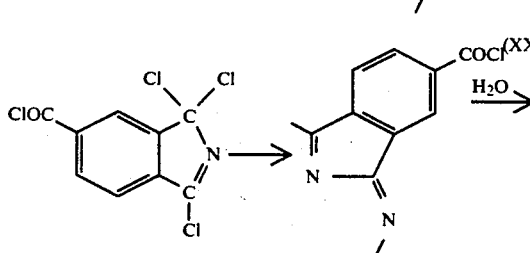
(XXIX)

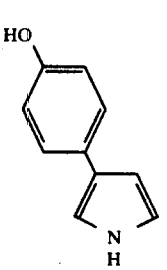 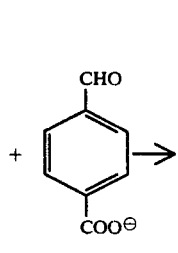

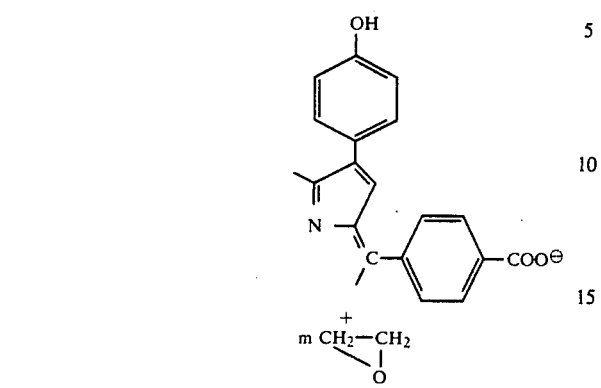

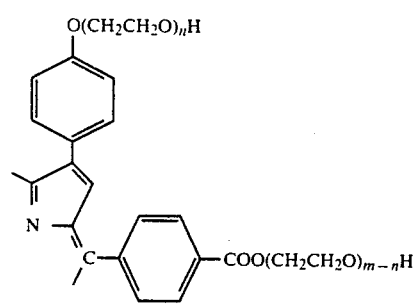

(XXXI)

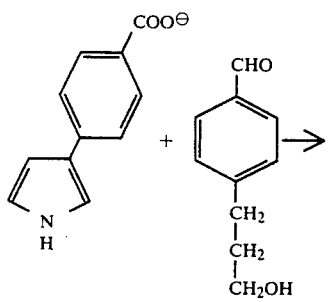

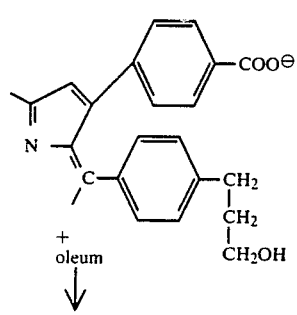

(XXXII)

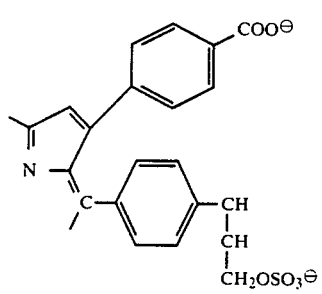

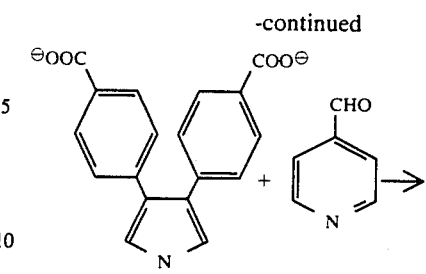

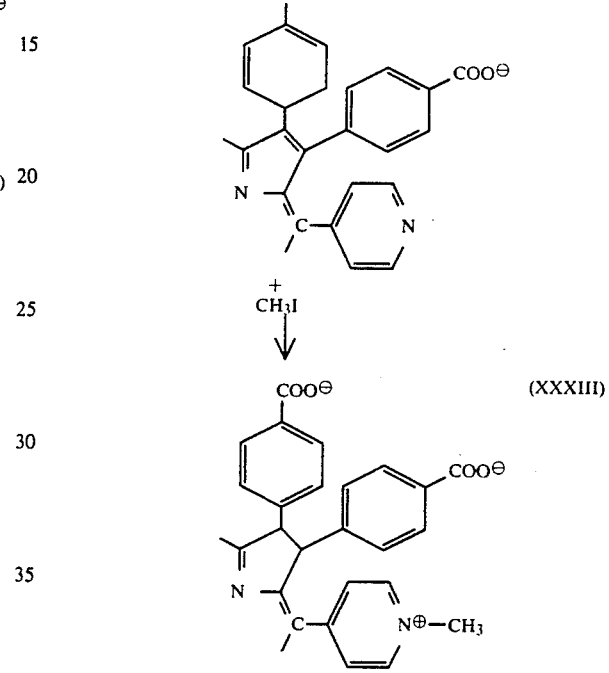

(XXXIII)

As usual, variations in starting materials make possible the preparation of aza derivatives and metallated derivatives to suit.

The sulfonate group as encompassed by this invention is limited to a "remote" location on the photoactivator molecule; i.e. displaced more than 5 atoms away from the porphine core. Remote sulfonation can preferably occur on aryl or heterocyclic groups or on relatively large alkyl groups themselves substituted into either the meso position or the pyrrole rings. These alkyl groups need not be simple carbon chains, but can be carbon chains interrupted by other groups such as those described hereinbefore.

Sulfonation of substituted porphines can be accomplished by ordinary methods such as are familiar to the skilled chemist. Sulfuric acid, oleum, chlorosulfonic acid and the like are effective sulfonating agents. As usual, higher degrees of sulfonation are obtained by increasing reaction time or temperature or by selection of a stronger sulfonating agent. For example, by condensing and rearranging a substituted maleimide,

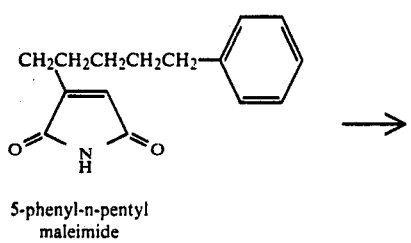

5-phenyl-n-pentyl maleimide

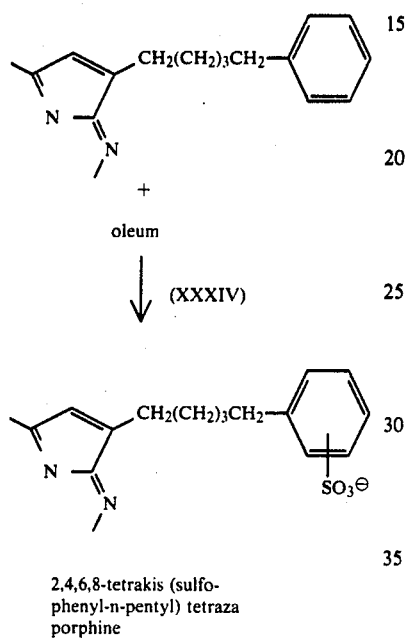

2,4,6,8-tetrakis (sulfo-phenyl-n-pentyl) tetraza porphine

Also, as described in Groves hereinbefore cited, reactions of the following form can be utilized:

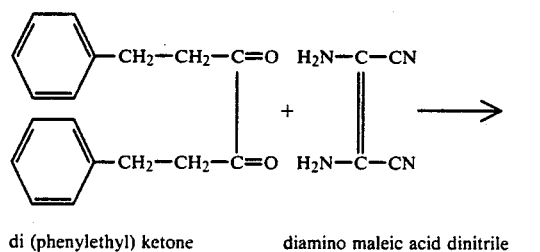

di (phenylethyl) ketone       diamino maleic acid dinitrile

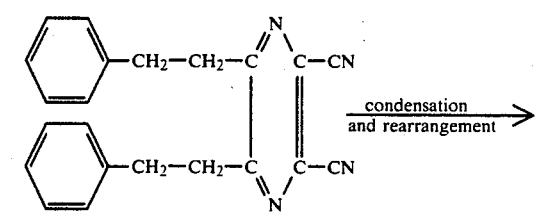

4-5 di (phenylethyl pyrazine)-2,3 dicarboxylic acid dinitrile

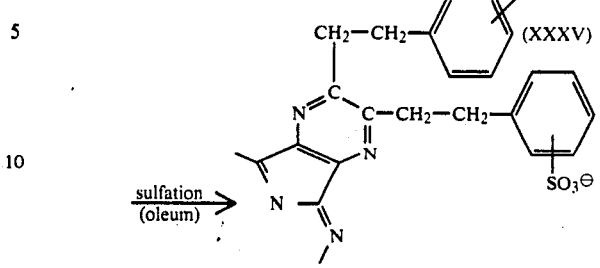

It is of course contemplated that sulfonation can, and frequently will, take place on both remote and proximate sites.

Remote sites are not excluded for the solubilizing groups of this invention other than sulfonate. Indeed, remote sites are preferred. Porphine structures solubilized at remote sites have a reduced tendency to aggregate into multilayers on fabric surfaces because they tend to have more bulk and less crystal order; hence the intensive blue/green coloration of these substances is imparted to the fabrics in reduced amount. Also, remotely solubilized porphines participate to a relatively small degree in the side reactions designated by numeral 7 on FIG. I; thus the excited singlet state of such compounds is converted more efficiently to the excited triplet state which reacts with oxygen to bring about the intended bleaching of stains. This is an economic advantage.

Porphines having remote solubilizing groups are, for example, compound XI supra where n is 5 or greater; compound XV where n is 2 or greater; compound XVII with 4 or more methylene groups interposed between the hydroxy group and the pyrrole ring; compound VII with 3 or more methylene groups interposed between the pyridine and pyrrole rings; compound X with 2 or more methylene groups interposed between the meso carbon atom and the benzene ring; etc.

Especially preferred photoactivators are remotely sulfated amino sulfonyl porphines. These compounds not only have the benefits discussed supra for remotely solubilized porphines generally, but also have the added benefit of substantivity to synthetic fibers as well as cotton fibers. These compounds can be prepared by a provess involving the following sequential steps:

(1) Preparing a porphine without solubilizing groups. This step is illustrated by the preparation of all cationic porphines exemplified hereinbefore, omitting the quaternization step; and by the preparation of all hydroxy porphines exemplified hereinbefore, where the starting materials are analogous non-hydroxy-substituted compounds.

(2) Reacting with chlorosulfonic acid and thionyl chloride to form the corresponding chlorosulfonated porphine.

(3) Condensing with an amino alcohol, using an aqueous medium and a temperature at which may be at, above, or below normal ambient.

(4) Sulfonating with oleum.

Illustrative examples of this preparative method are:

37

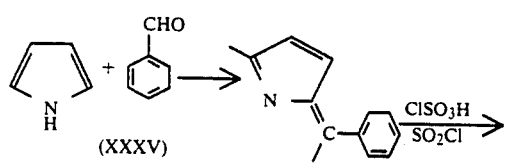
(XXXV)

α,β,γ,δ - tetrakis (4-sulfatophenyl amino sulfonyl phenyl) porphine

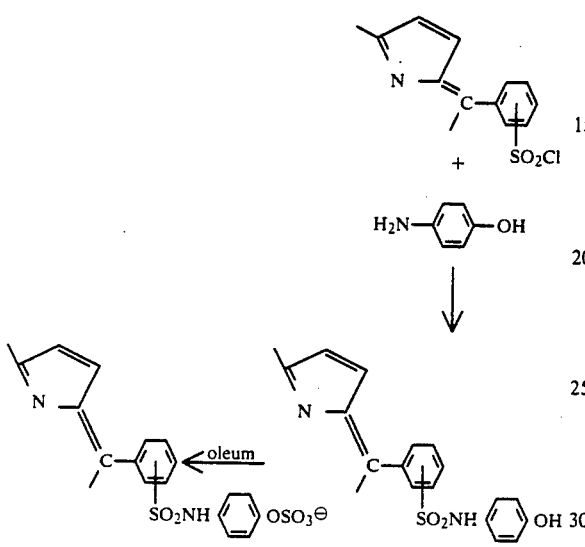

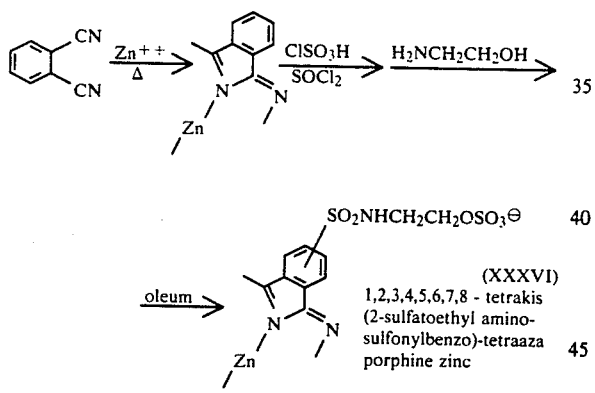

(XXXVI) 1,2,3,4,5,6,7,8 - tetrakis (2-sulfatoethyl aminosulfonylbenzo)-tetraaza porphine zinc Among the amino alcohols that are operable in these reactions may be mentioned 2-amino-2-methyl-1,3-propane diol, 2-amino-2-ethyl-1,3-propane diol, tri(hydroxymethyl) amino methane, 1-amino glucose, 2-amino glucose, and 1-methylamino-2,3-propane diol.

The aminosulfonyl compounds discussed supra contain the

group interrupting the chain of atoms linking the —OSO₃⊖ solubilizing group and the porphine core. It is also contemplated that many other non-methylene groups can be interrupting groups, as explained hereinbefore.

Whatever the nature of the interrupting group, the solubilizing group can be any of those discussed herein.

38

Preparative methods for such compounds fall within the ordinary skill of the art supplemented by the disclosure herein. For example,

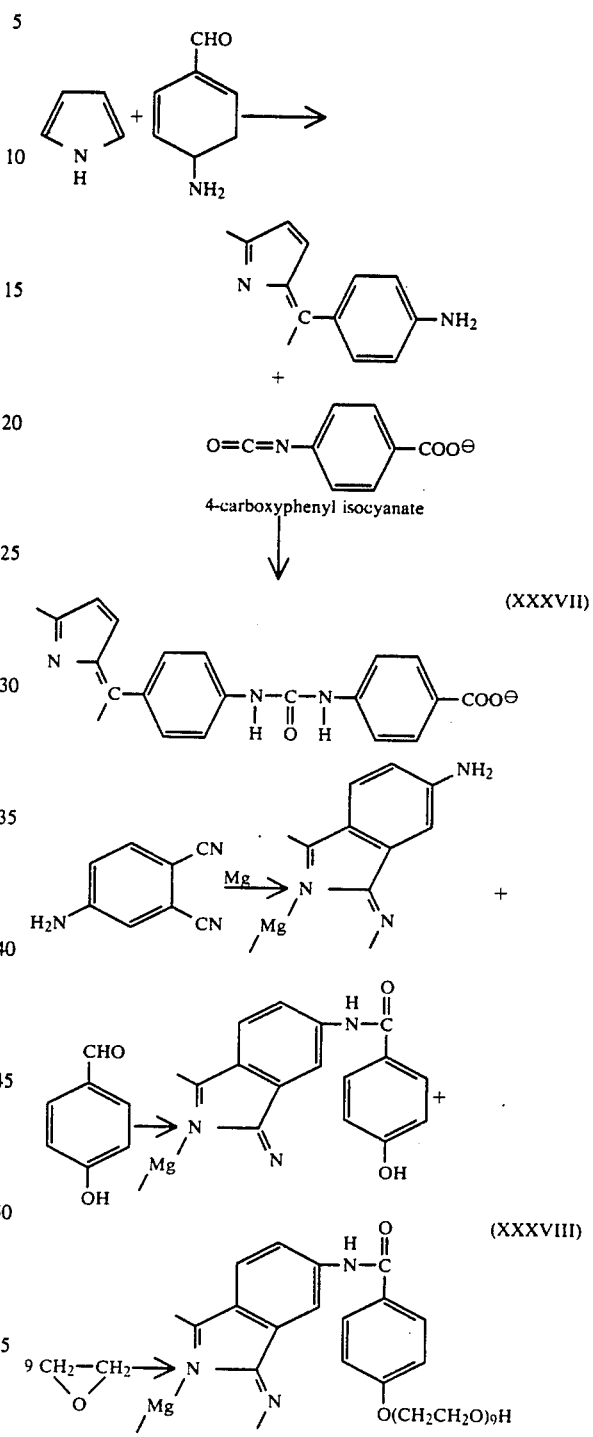

Many of the reactants used in the foregoing methods of preparation are commonly known and readily available to the skilled organic chemist. Certain general methods of synthesis can be described below, as follows:

Substituted pyrroles can be prepared by heating 1,4 dicarbonyl compounds (diacids or keto acids) with ammonia. For example,

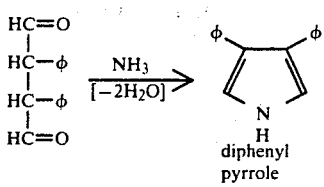

diphenyl pyrrole

Heterocyclic 2-aldehydes containing hetero or oxygen atoms can be prepared from pentosans by hydrolysis to pentoses followed by dehydration and oxidation. For example,

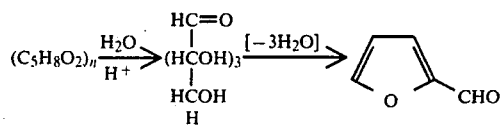

Heterocyclics containing sulfur or nitrogen hetero atoms can be converted into 2-aldehydes by reacting with HCl and HCN, followed by hydrolyzing with water. Two examples follow:

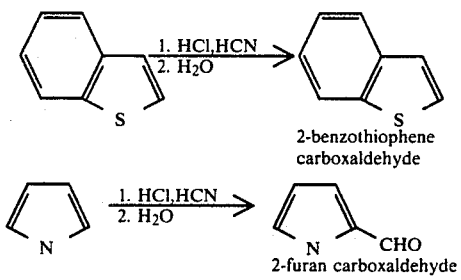

2-benzothiophene carboxaldehyde 2-furan carboxaldehyde

A general method of preparing amino hydroxy alcohols is as follows, where the R's may be H, alkyl, or substituted alkyl:

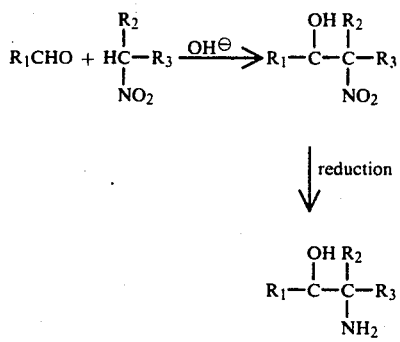

The foregoing description concerns compositions containing only surfactant and photoactivator, which are the essential elements of this invention. They are unbuilt compositions. Other components are optional, as the photoactivators of this invention are useful in a great variety of otherwise conventional compositions.

For instance, conventional alkaline detergent builders, inorganic or organic, can be used at levels up to about 80% by weight of the composition, i.e. from 0 to about 80%. For built compositions, levels from about 10% to about 60% are preferred, and levels from about 20% to about 40% are especially preferred. The weight ratio of surfactant to total builder in built compositions can be from about 5:1 to about 1:5, preferably from about 2:1 to about 1:2.

Examples of suitable inorganic alkaline detergency builder salts useful in this invention are water soluble alkali metal carbonates, borates, phosphates, polyphosphates, bicarbonates and silicates. Specific examples of such salts are sodium and potassium tetraborates, perborates, bicarbonates, carbonates, tripolyphosphates, pyrophosphates, orthophosphates, and hexametaphosphates.

Examples of suitable organic alkaline detergency builder salts are: (1) Water-soluble aminopolycarboxylates, e.g. sodium and potassium ethylenediaminetetraacetates, nitrilotriacetates and N-(2-hydroxyethyl)-nitrilodiacetates; (2) Water-soluble salts of phytic acid, e.g., sodium and potassium phytates—See U.S. Pat. No. 2,739,942; (3) Water-soluble polyphosphonates, including specifically, sodium, potassium and lithium salts of ethane-1-hydroxy-1,1,-diphosphonic acid; sodium, potassium and lithium salts of methylene diphosphonic acid; sodium, potassium and lithium salts of ethylene diphosphonic acid; and sodium, potassium and lithium salts of ethane-1,1,2-triphosphonic acid. Other examples include the alkali metal salts of ethane-2-carboxy-1,1-diphosphonic acid, hydroxymethanediphosphonic acid, carbonyldiphosphonic acid, ethane-1-hydroxy-1,1,2-triphosphonic acid, ethane-2-hydroxy-1,1,2-triphosphonic acid, propane-1,1,3,3-tetraphosphonic acid, propane-1,1,2,3-tetraphosphonic acid, and propane-1,2,2,3-tetraphosphonic acid; (4) Water-soluble salts of polycarboxylate polymers and copolymers as described in U.S. Pat. No. 3,308,067.

A useful detergent builder which may be employed in the present invention comprises a water-soluble salt of a polymeric aliphatic polycarboxylic acid having the following structural relationships as to the position of the carboxylate groups and possessing the following prescribed physical characteristics: (a) a minimum molecular weight of about 350 calculated as to the acid form; (b) as equivalent weight of about 50 to about 80 calculated as to acid form; (c) at least 45 mole percent of the monomeric species having at least two carboxyl radicals separated from each other by not more than two carbon atoms; (d) the site of attachment of the polymer chain of any carboxyl-containing radical being separated by not more than three carbon atoms along the polymer chain from the site of attachment of the next carboxyl-containing radical. Specific examples of the above-described builders include polymers of itaconic acid, aconitic acid, maleic acid, mesaconic acid, fumaric acid, methylene malonic acid and citraconic acid and copolymers with themselves.

In addition, other polycarboxylate builders which can be used satisfactorily include water-soluble salts of mellitic acid, citric acid, pyromellitic acid, benzene pentacraboxylic acid, oxydiacetic acid, carboxymethyloxysuccinic acid and oxydisuccinic acid.

Certain zeolites or aluminosilicates enhance the function of the alkaline metal pyrophosphate and add building capacity in that the aluminosilicates sequester calcium hardness. One such aluminosilicate which is useful in the compositions of the invention is an amorphous water-insoluble hydrated compound of the formula $Na_x(xAlO_2 \cdot SiO_2)$, wherein x is a number from 1.0 to 1.2 and y is 1, said amorphous material being further characterized by a $Mg^{++}$ exchange capacity of from about 50 mg eq. $CaCO_3$/g. to about 150 mg eq. $CaCO_3$/g. and a particle diameter of from about 0.01 microns to about 5 microns. This ion exchange builder is more fully described in British Pat. No. 1,470,250 invented by B. H. Gedge et al, published Apr. 14, 1977, herein incorporated by reference.

A second water-insoluble synthetic aluminosilicate ion exchange material useful herein is crystalline in nature and has the formula $Na_z[(AlO_2)_z \cdot (SiO_2)]xH_2O$, wherein z and y are integers of at least 6; the molar ratio of z to y is in the range from 1.0 to about 0.5, and x is an integer from about 15 to about 264; said aluminosilicate ion exchange material having a particle size diameter from about 0.1 micron to about 100 microns; a calcium ion exchange capacity on an anhydrous basis of at least about 200 milligrams equivalent of $CaCO_3$ hardness per gram; and a calcium ion exchange rate on an anhydrous basis of at least about 2 grains/gallon/minute/gram. These synthetic aluminosilicates are more fully described in British Pat. No. 1,429,143 published Mar. 24, 1976, invented by Corkill et al, herein incorporated by reference.

For nominally unbuilt compositions, it is contemplated that compositions can contain minor amounts, i.e. up to about 10%, of compounds that, while commonly classified as detergent builders, are used primarily for purposes other than reducing free hardness ions; for example electrolytes used to buffer pH, add ionic strength, control viscosity, prevent gelling, etc.

It is to be understood that the detergent bleach compositions of the present invention can contain other components commonly used in detergent compositions. Soil suspending agents such as water-soluble salts of carboxymethylcellulose, carboxyhydroxymethylcellulose, copolymers of maleic anhydride and vinyl ethers, and polyethylene glycols having a molecular weight of about 400 to 10,000 are common components of the detergent compositions of the present invention and can be used at levels of about 0.5% to about 10% by weight. Dyes, pigments, optical brighteners, and perfumes can be added in varying amounts as desired.

Other materials such as fluorescers, antiseptics, germicides, enzymes in minor amounts, and anti-caking agents such as sodium sulfosuccinate and sodium benzoate may also be added. Other materials useful in detergent compositions are clay, especially the smectite clays disclosed in U.S. Pat. No. 3,915,882, suds boosters, suds depressants, fillers such as sodium sulfate, pH buffers, and hydrotropes such as sodium toluene sulfonate and urea.

Peroxygen bleaches such as sodium perborate can optionally be used in the compositions of this invention; they are however effective only at relatively high temperatures such as approximately 160° F. and above. In conjunction therewith, conventional chemical activators can be used to bleach more effectively at low temperatures, such as the anhydrides, esters and amides disclosed by Gilbert in Detergent Age, June 1967 pages 18-20, July 1967 pages 30-33, and August 1967 pages 26-27 and 67. It is generally believed that these activators function by means of a chemical reaction that requires usage in approximately a 1:1 mol ratio with the peroxygen compound. Catalytic photoactivators for peroxy bleaches can also be used, such as the iron porphines, haemin chlorides and iron phthalocyanines disclosed is copending commonly assigned patent application Ser. No. 697,006 filed June 17, 1976.

It should be understood that, as described in detail hereinbefore, the instant photoactivators do not function by activating perborate or other peroxygen compounds; the mechanism by which the instant photoactivators accomplish their purpose is by activating atmospheric oxygen. Nevertheless, formulations are not precluded that contain components which bleach by two different mechanisms operating independently.

Granular formulations embodying the compositions of the present invention may be formed by any of the conventional techniques i.e., by slurrying the individual components in water and then atomizing and spray-drying the resultant mixture, or by pan or drum granulation of the components. A preferred method of spray drying compositions in granule form is disclosed in U.S. Pat. Nos. 3,629,951 and 3,629,955 issued to Davis et al on Dec. 28, 1971.

Liquid detergents embodying the photoactivating compositions of the present invention can contain builders or can be unbuilt. If unbuilt, they can contain about 10 to about 50% surfactant, from 1 to about 15% of an organic base such as mono-, di-, or tri-alkanolamine, and a solubilization system containing various mixtures of water, lower alcohols and glycols, and hydrotropes. Built liquid single-phase compositions can contain about 10 to about 25% surfactant, from about 10 to about 20% builder which can be inorganic or organic, about 3 to about 10% hydrotrope, and water. Built liquid compositions in multi-phase heterogeneous form can contain comparable amounts of surfactant and builder together with viscosity modifiers and stabilizers to maintain stable emulsions or suspensions.

Compositions of the invention in the form of detergent laundry bars can be prepared as described in U.S. Pat. No. 3,178,370 issued Apr. 13, 1965 and British Pat. No. 1,064,414 issued Apr. 5, 1967, both to Okenfuss and both herein incorporated by reference. A preferred process, called "dry neutralization", involved spraying the surfactant in liquid, acid form upon an agitated mixture of alkaline components such as phosphates and carbonates, followed by mechanically working as by milling, extruding as in a plodder, and forming into bars.

The detergent bleach composition of this invention can also be incorporated if desired into substrate articles. These articles consist of a water-insoluble substrate which releasably incorporates an effective amount, preferably from about 3 to about 120 grams, of the detergent composition described herein, plus an effective amount of photoactivating bleach as described herein.

Detergent bleach formulations embodying the compositions of the present invention are commonly used in laundry practice at concentrations from about 0.1 to about 0.6 wt.% in water. Within these approximate ranges are variations in typical usage from household to household and from country to country, depending on washing conditions such as the ratio of fabric to water, degree of soiling of the fabrics, temperature and hardness of the water, method of washing whether by hand or by machine, specific formulation employed, etc.

It has been stated hereinbefore that photoactivator usage is from about 0.005% to about 0.5% by weight based on the detergent bleach composition, preferably from about 0.01% to about 0.1%. Combining those figures with the foregoing detergent bleach concentrations in water yields the result that photoactivator concentrations in water range from about 0.05 parts per million (ppm) to about 30 ppm. Within this range, from about 0.25 to about 5 ppm. are preferred. The lower side of the foregoing ranges are especially effective when the laundry process involves exposing fabric to photoactivator for a relatively long time, as for example during a 30 to 120-minute presoak followed by a 20 to 30-minute wash, and drying the fabric in brilliant sunlight. The higher side of the foregoing ranges and needed when the laundry process involves exposing fabric to photoactivator for a relatively short time, as for example during a short 10-minute wash followed by drying in an illuminated dryer, on a line indoors, or outdoors on a cloudy day. While exposure to oxygen and visible light are essential, the source, intensity and duration of exposure of the light affect merely the degree of bleaching achieved.

In general, laundry practice embodying the present invention in its processing aspect comprises removing stains from cotton textiles by treating the textiles, in the presence of visible light and oxygen, with an aqueous solution of a composition of this invention. More particularly, the process comprises the following steps: (i) washing fabrics with a detergent bleach composition, (ii) rinsing the fabrics, (iii) drying the fabrics, and (iv) providing exposure to visible light and oxygen during any of steps (i), (ii) or (iii). These steps are appropriate whatever physical form detergent bleach may be employed (e.g. granule, liquid, bar, substrate) and whatever means of exposure to light and oxygen are employed (e.g outdoor washing, outdoor drying, illuminated washing machine, illuminated dryer).

EXAMPLE I

α, β, γ, δ-tetrakis (4-carboxyphenyl) porphine was prepared by refluxing a propionic acid solution, 0.24 molar in both 4-carboxybenzaldehyde and pyrrole, for 2 hours. Upon cooling the reaction mixture, purple crystals of α, β, γ, δ-tetrakis (4-carboxyphenyl) porphine precipitated. Yield was 32%. The product was purified by recrystallization from methanol/chloroform solutions.

The foregoing method of preparation is similar to that described by Longo et al., J. Heterocyclic Chem. 6, 927(1969) and the following spectral analysis performed on a Cary 14 spectrophotometer in pyridine solution agree very well with Longo's and Datta-Gupta's findings, J. Heterocyclic Chem., 3, 195(1966):

| Wave length | $\lambda$(nm) | 423 | 517 | 552 | 591 | 646 |
|---|---|---|---|---|---|---|
| Extinction coefficient | log $\epsilon$ | 5.25 | 4.15 | 3.85 | 3.65 | 3.48 |

Metallation was accomplished as follows: one gram of tetrakis (4-carboxyphenyl) porphine was reacted with a 10% excess of zinc acetate in refluxing dimethyl formamide for one hour. After completion of the reaction, the solvent was removed on a rotavaporator to obtain a residue. This residue was dissolved in water, acidified to pH 3, and passed through the H⊕ form of the cation exchange resin Dowex 5DW-X8(50-100 mesh) to remove the excess ionic zinc. The residue after evaporation yielded a red crystalline product with about 98% yield. Spectral analysis on a Cary 14 spectrophotometer in methanol agreed very well with published date for α, β, γ, δ-tetrakis (4 carboxyphenyl) porphine zinc, Longo et al., J. Heterocyclic Chem. 6, 927(1969):

| Wave length | $\lambda$(nm) | 429 | 517 | 556 | 596 |
|---|---|---|---|---|---|
| Extinction coefficient | log $\epsilon$ | 5.54 | 3.46 | 4.15 | 3.75 |

The acid form of photoactivator, prepared as described above, was converted to the tetra sodium salt upon addition to alkaline (pH~10) detergent solution, the cations of which were predominantly sodium.

α, β, γ, δ-tetrakis (4-carboxyphenyl) porphine tetrasodium salt, both unmetallated and metallated with zinc, were evaluated as photoactive bleaches in conjunction with a granular detergent having the following composition identified herein as Composition [E] which has a pH at use concentration in water of about 10.2.

| Component | Wt. % Composition [E] |
|---|---|
| $C_{12}$ branched chain alkyl benzene sulfonate | 20 |
| Sodium tripolyphosphate | 28 |
| Sodium toluene sulfonate | 2 |
| Silicate solids (2.0 ratio $SiO_2/Na_2O$) | 5.4 |
| Sodium sulfate | 34 |
| Sodium carbonate | 0.17 |
| Sodium carboxymethyl cellulose | 0.45 |
| Perfume | 0.1 |
| Optical brightener | [none] |
| Miscellaneous | 1.38 |
| Moisture | 8.5 |
| Total detergent | 100.00 |

Tergotometer tests were run as follows: to each 1-gal. tub was added 1000 ml. of water having a hardness of 7 grains/gallon with a Ca/Mg ration of 3/1, and 2.5 gm. of detergent composition [E] defined above; the concentration of detergent in the solution was accordingly 0.25%. Photoactivator was added to certain of the solutions, as described in Table I. The cloth load in each tub was 5.3 gm. in weight and consisted of six cotton swatches 2½×2½ inches in size, 3 of which had been previously stained with tea and 3 with wine. [Staining had been accomplished by passing cotton muslin through a boiled tea or wine bath, respectively, followed by squeegeeing, drying and aging.] The swatches were washed in the Tergotometer for 10 minutes at 70° F. with a rotor speed of 110 rpm.; were rinsed by hand for 1 minute at 70° F. in a beaker containing 500 ml. of water having the same hardness as that used for washing, and were line-dried outdoors in the sun for 1 hour. After drying, the swatches were read on a Gardner XL-10 Color Difference Meter and the resultant L, a and b values were calculated into whiteness according to the formula $$W = 100 - \sqrt{(100 - L)^2 + a^2 + b^2}$$

These values of whiteness were compared with those of stained swatches before the Tergotometer treatment to obtain ΔW values which measure the extent of bleaching accomplished by the photoactivators. Results are given in Table I, and are discussed hereinafter.

TABLE I
BLEACHING/STAIN REMOVAL (ΔW)
Built Detergent Composition [E] 0.25%

| Type of Stain | Wine | | Tea | |
|---|---|---|---|---|
| Conc. of Photoactivator (ppm.) | 1 | 10 | 1 | 10 |
| Type of Photoactivator | | | | |
| None | 8.6 | 8.6 | 7.7 | 7.7 |

TABLE I-continued

BLEACHING/STAIN REMOVAL (ΔW)
Built Detergent Composition [E] 0.25%

| Type of Stain | Wine | | Tea | |
|---|---|---|---|---|
| Conc. of Photoactivator (ppm.) | 1 | 10 | 1 | 10 |
| Tetrasulfobenzo tetraaza porphine zinc, tetrasodium salt | 11.2 | 12.1 | 8.2 | 9.8 |
| α, β, γ, δ - tetrakis (4-carboxyphenyl) porphine, tetrasodium salt | 10.8 | 11.3 | 8.4 | 8.5 |
| α, β, γ, δ - tetrakis (4-carboxyphenyl) porphine zinc, tetrasodium salt | 10.9 | 9.2 | 7.4 | 7.0 |
| α, β, γ, δ - tetrakis (4-N-methyl pyridyl) porphine zinc, tetra (4-toluene sulfonate) salt | 9.9 | 10.0 | 7.3 | 7.3 |

[90% LSD = 0.4]

EXAMPLE II

α, β, γ, δ- tetrakis (4-N-methyl pyridyl) porphine, tetra (4-toluene sulfonate) salt was prepared as follows: a propionic acid solution, 0.24 molar in both pyridine 4-carboxyaldehyde and pyrrole, was refluxed for 45 min. The solvent was flashed off and the residue was washed with dimethylformamide to dissolve the tarry byproducts leaving purple crystals of tetra (4-pyridyl) porphine. Yield was 22.5% and the product spectral characteristics were in substantial agreement with those observed by Fleisher, Inorg. Chem. 1, 493(1962).

The tetra (4-pyridyl) porphine (0.25 mol) was then refluxed with sodium 4-toluene sulfonate (1.1 mol) overnight in dimethyl formamide. The reaction was then cooled in an ice bath and the product was removed by filtration. The collected violet crystals of α, β, γ, δ-tetra (N-methyl pyridyl) porphine, tetra 4-toluene sulfonate salt were washed with acetone and dried under vacuum. Yield was 92%. Spectral analysis in water at pH 6–7 on a Cary 14 spectrophotometer agreed very well with published data, Pasternack et al., J. Amer. Chem. Soc., 94, 4511(1972):

| Wave length | λ(nm) | 422 | 518 | 551 | 585 | 641 |
|---|---|---|---|---|---|---|
| Extinction coefficient | log ε | 5.17 | 3.96 | 3.83 | 3.57 | 3.07 |

Elemental analysis yielded the following calculated and found values for the empirical formula $C_{72}H_{66}N_8S_4O_{12}$:

| | C | H | N | S |
|---|---|---|---|---|
| Calc: | 63.42 | 4.88 | 8.22 | 9.41 |
| Found: | 63.15 | 5.03 | 8.41 | 9.14 |

Metallation was accomplished in a manner similar to that described above for the tetracarboxy porphine of Example 1, with purification accomplished by chromatographic chloroform solutions on alumina. The metallation was done prior to quaternization with 4-toluene sulfonate.

Tergotometer tests made as described in Example I were run on the metallated derivative α, β, γ, δ-tetrakis (4-N-methylpyridyl) porphine zinc, tetra (4-toluene sulfonate) salt. Results are given in Table I, and are discussed hereinafter.

Table I presents bleaching, i.e. stain removal, data for aqueous solutions, of a built detergent composition described hereinbefore containing four different photoactivators and a control, respectively. All numbers appearing in the table represent the average of duplicate tests. Whiteness improvement during treatment is presented for two concentrations, each, for wine stains and for tea stains.

The first composition contained no photoactivator and was the control composition for reference purposes.

The second composition contained the photoactivator disclosed by Holcombe and Schultz in Japanese patent application OPI 50-113,479 (U.S. Ser. No. 419,320) referred to hereinbefore.

The third, fourth, and fifth compositions are compositions according to this invention. It is apparent that fabrics washed in compositions containing the unmetallated photoactivator of this invention are, for every test condition, more white than those washed in comparable compositions containing no photoactivator. Fabrics washed in compositions containing metallated photoactivators were effective bleaches for wine stains but were not effective for tea stains. For all tests reported herein, reference to photoactivator usage is on a 100% active basis as determined chromatographically.

EXAMPLE III

Tetra (2-sulfatoethyl sulfonamido benzo) tetraaza porphine zinc, tetrasodium salt was prepared as follows: twenty parts of tetrasulfo tetrabenzo tetraaza porphine zinc, tetrasodium salt were added to 200 parts of chlorosulfonic acid with agitation and the mixture is heated to 60° C. At this temperature, 30 parts of thionyl chloride were added dropwise and the mixture was then heated for 4 hours at 80° C. The reaction mixture was then cooled and added with agitation to 200 parts of cold water from which the tetrachloro sulfo tetrabenzo tetraaza porphine zinc was separated by filtration and subsequently washed with 1000 parts of cold water. The tetrachlorosulfo tetrabenzo tetraaza porphine paste was then suspended in 300 parts of cold water and mixed with 30 parts of 2-aminoethanol for 20 hours at 20° C. The suspension was then acidified with hydrochloric acid to obtain a precipitate which was separated by filtration, washed with water and dried. Twenty parts of the already obtained ethanolsulfonamide derivative of tetrabenzo tetraaza porphine zinc were then mixed for 12 hours at 20° C. with 100 parts of 10% oleum. The solution was then poured in a solution of 100 parts of sodium chloride into 1700 of water, and 400 parts of ice were added. A blue/green precipitate was formed and was separated by filtration and was washed with a solution of sodium chloride in water and ethyl alcohol until it was neutral to Congo red. The blue/green powder obtained was then dried at 105° C. for 2 hours. The product was purified by six successive precipitations from aqueous solution by the addition of four volumes of acetone. Yield was 28%.

Substitution on all sulfo groups was confirmed by the chromatographic techniques described in Japanese patent application laid open to the public as OPI 50-113,479 on Sept. 5, 1975 which corresponds to U.S. Ser. No. 419,320 filed Nov. 27, 1973.

Examination of the spectrum of 1, 2, 3, 4, 5, 6, 7, 8-tetrakis (2-sulfo-ethyl sulfonamido benzo) α,β,γ,δ-tetraaza porphine zinc, tetrasodium salt, in $H_2O$ at pH 9.5, using a Cary 14 spectrophotometer, yielded the following results:

| Wave length | $\lambda$(nm) | 686 | 672 | 653 |
|---|---|---|---|---|
| Extinction coefficient | $\log \epsilon$ | 4.46 | 4.64 | 3.91 |

Analysis of the zinc content by atomic absorption yielded 4.32% zinc vs. 4.40% theoretical on the basis of the empirical formula $C_{40}H_{36}N_{12}S_8O_{22}ZnNa_4 \cdot 2H_2O$.

The test reported in Table II involved photoactivator used together with unbuilt detergent compositions in liquid form. The ingredients for these compositions are:

| Component | Wt. % Composition [F] |
|---|---|
| $C_{14-15}$ alkyl polyethoxy ether having an average of 7 mols of ethylene oxide per mol of alcohol | 33 |
| Sodium $C_{12}$ alkyl benzene sulfonate | 22 |
| Oleic acid | 1.0 |
| Triethanol amine | 5.5 |
| Ethanol | 4.7 |
| Electrolyte (0.9 KOH; 0.1 citric acid) | 1.0 |
| Perfume, color and brightener | 0.7 |
| Water and Miscellaneous | 32.1 |
| | 100.0 |
| pH at use conc. in $H_2O$ ~8.5 | |

| Component | Wt. % Composition [G] |
|---|---|
| Ammonium salt of coconut alkyl polyethoxy ether sulfate having an average of 3 mols of ethylene oxide per mol of alcohol | 25 |
| Sodium salt of $C_{14-16}$ alkyl polyethoxy ether sulfate having an average of 2 mols of ethylene oxide per mol of alcohol | 5 |
| Sodium salt of coconut alkyl glyceryl ether sulfonate | 4 |
| Potassium toluene sulfonate | 0.5 |
| Ethanol | 6.9 |
| Electrolytes (2.5 KCl; 0.5 $H_3PO_4$; 0.5 potassium toluene sulfonate; 0.1 citric acid) | 3.6 |
| Citric acid, perfume and opacifier | 1.2 |
| Ethylene glycol distearate | 1.0 |
| Water and miscellaneous | 52.8 |
| | 100.0 |
| pH at use conc. in $H_2O$ ~7.0 | |

Tergotometer tests were run in a manner which involved a soaking process followed by a washing process, as follows: to each 1-gal. tub was added 1000 ml. of water having a hardness of 9 grains/gallon with a Ca/Mg ratio of 3/1 and 3.6 gm. of detergent composition ([F] or [G]) defined above; the concentration of detergent in the solution was accordingly 0.36%. Photoactivator was added to certain of the solutions, as described in Table II. The cloth load in each tub consisted of $2\frac{1}{2}$-inch square swatches, 2 of which were cotton muslin previously stained with tea in the manner hereinbefore described, plus 8 clean terry cloth swatches to make a total cloth load of 9.9 grams. All swatches were soaked for $1\frac{1}{2}$ hours at 70° F., following which 4 terry swatches were removed after the soaking solution clinging thereto had been squeezed back into the tubs. The remaining swatches were washed for 10 minutes at 110 rpm. and rinsed by hand under the tap (city water, about 6 gr./gal.). After line-drying in the sun for 1 hour, the stained, soaked and washed swatches were read on the Gardner XL-10 as before. Values of W were obtained as compared with the W for stained swatches read prior to the soaking, washing and sun drying treatment. Differential values $\Delta W$ which are given in Table II measure the extent of bleaching which was accomplished by the photoactivator.

TABLE II

BLEACHING/STAIN REMOVAL ($\Delta W$)
Unbuilt Detergent Compositions 0.36%
Tea Stains
Photoactivator Conc. 3.5 ppm.

| Type of Photoactivator | Composition F | Composition G |
|---|---|---|
| None | 2.4 | 4.7 |
| $\alpha, \beta, \gamma, \delta$ - tetrakis (4-carboxyphenyl) porphine, tetra sodium salt | 4.7 | 4.1 |
| Tetra(2-sulfato-ethyl sulfon-amido benzo) tetra-aza zinc, tetra sodium salt | 4.2 | 5.6 |
| [90% LSD = 1.3] | | |

Table II presents bleaching, i.e. stain removal, data for two liquid compositions described hereinbefore, each containing photoactivators of this invention, in comparison with a control. It is apparent that in one of these unbuilt detergents the compositions containing both photoactivators exhibit significant bleaching effects.

Other soaking/washing Tergotometer tests were run in the manner described in the preceding paragraphs with certain important changes: The detergent used was composition [E] as hereinbefore defined. Detergent concentration in solution was 0.6% and photoactivator concentration in solution was 0.3 ppm. In addition to the tea stained and white terry swatches previously described were 8 similarly sized swatches cut from a bolt of yellow fabric purchased in Mexico. After soaking, washing, and sun drying as hereinbefore described, it was found that, as compared to the control composition, the composition containing photoactivator not only bleached the tea stains but also bleached the yellow dye that had bled from the yellow fabric and had deposited upon the originally white terry swatches. This effect was measured by the Gardner b value which is a measure of yellowness. These results are given in Table III and described thereafter.

No change in the appearance of the yellow fabrics themselves were observed to be caused by the photoactivator.

Comparable tests were also run, the swatches of which were dried in a dark room instead of in sunlight. No bleaching took place in the absence of light, and the fabrics treated with photoactivator solution were in fact pale blue/green in color due to the intrinsic blue/green color of the photoactivator compound. This color disappeared upon later exposure of the fabrics to light.

Other comparable tests were run using the yellow Mexican fabrics in solutions of detergent compositions [F] and [G] with and without photoactivator. As with composition [E], the photoactivator both bleached the tea stains and reduced transfer of yellow dye to the originally white terry fabrics.

TABLE III

BLEACHING/STAIN REMOVAL (ΔW) and DYE TRANSFER REMOVAL (b)
Built Detergent Composition [E] 0.6%
Photoactivator Conc. 0.3 ppm.

| Type of swatch | Tea-stained muslin | White terry |
|---|---|---|
| Test purpose | Bleaching/Stain Removal | Dye Transfer Removal |
| Type of photoactivator | | |
| None | ΔW = 6.6 | b = 1.73 |
| α, β, γ, δ - tetrakis (4-carboxyphenyl) porphine, tetra sodium salt | ΔW = 8.8 | b = 0.97 |
| Tetra(2-sulfatoethyl sulfamido benzo) tetraaza zinc, tetra sodium salt | ΔW = 8.0 | b = 0.43 |
| [90% LSD] | [0.6] | [0.7] |

Table III presents, for a built detergent composition described hereinbefore, data for both bleaching and dye transfer removal brought about by two photoactivators of this invention in comparison with a control. It is apparent that both photoactivators are significantly effective in both respects.

EXAMPLE IV

Detergent bleach compositions of this invention are prepared as described in Table IV which follows. Compositions 12, 15 and 16 are in liquid form while the remainder are in granular form. When tested for bleaching in the manner described in Example I they are effective. All figures in the table are weight percent of the compositions, and identification of the components specified in the table appears thereafter. For all compositions the balance not specified is comprised of sodium sulfate.

Compositions 17, 18 and 19 are prepared like compositions 2, 11 and 16, respectively, except that the porphine derivatives are metallated with aluminum instead of zinc. Compositions 20, 21 and 22 are similarly prepared except they are metallated with calcium. When tested for bleaching in the manner described in Example I they are effective.

TABLE IV

| Composition No. | Photoactivator | Surfactant | Builder | Moisture | Other Components |
|---|---|---|---|---|---|
| 1 | 0.20% pa | 10% sa | 44% ba | 14% | 1% oa |
|   |          |        |        |     | 0.2 ob |
|   |          |        |        |     | 2 ob |
| 2 | 0.015 pb | 15 sb | 8 bb | 10 | 0.5 oa |
|   |          |       | 2 bg |    | 0.1 ob |
|   |          |       | 15 bh |   | 1 od |
| 3 | 0.005 pc | 15 sc | 20 bb | 5 | 0.1 ob |
|   |          | 5 sm  | 10 bf |   | 0.5 oe |
|   |          |       | 10 bl |   |        |
| 4 | 0.25 pd  | 20 sa | 22 bc | 6 | 0.2 of |
|   |          | 10 sd | 8 bg  |   |        |
| 5 | 0.25 pa  | 30 se | 10 bb | 8 | 0.1 ob |
|   | 0.25 pe  | 10 sk | 10 bi |   |        |
| 6 | 0.010 pf | 40 sb | 10 bm | 2 | 0.5 oa |
|   |          | 10 sl |       |   |        |
| 7 | 0.40 pg  | 12 sf | 40 ba | 10 | 1 oc |
|   |          | 3 sn  | 10 bj |    |      |
|   |          |       | 10 bn |    |      |
| 8 | 0.025 ph | 15 sa | 15 ba | 4 | 0.1 of |
|   |          | 10 sg | 15 be |   | 0.5 oh |
|   |          |       | 5 bg  |   | 10 05 |
| 9 | 0.02 pi  | 12 sh | 50 ba | 6 | 0.2 ob |
|   |          |       | 10 bf |   |        |
|   |          |       | 20 bk |   |        |
| 10 | 0.15 pj | 2 sj | 24 bd | 7 | 10 oi |
|    |         | 26 sp | 4 bg |   |        |
| 11 | 0.25 pk | 32 sc | 0 | 11 | 1 oa |
|    |         | 8 si |   |    | 1 oc |
| 12 | 0.05 pl | 14 sq | 12 bn | 61.3 | 0.5 ob |
|    |         |       |       |      | 12 oc |
|    |         |       |       |      | 0.1 og |
| 13 | 0.35 pm | 18 sc | 0 | 12 | 0.1 of |
|    |         | 4 so  |   |    |        |
| 14 | 0.04 pn | 30 se | — | 10 | 2 bj |
|    |         |       |   |    | 0.1 ob |
| 15 | 0.10 po | 17 sq | 0 | 71.9 | 5 oc |
|    |         |       |   |      | 6 om |
| 16 | 0.20 pp | 8 sm | 0 | 61.4 | 0.3 ob |
|    |         | 15 sr |   |     | 3 oc |
|    |         |       |   |     | 0.01 og |
|    |         |       |   |     | 10 ok |

TABLE IV-continued

| Compo-sition No. | Weight Percent | | | | |
|---|---|---|---|---|---|
| | Photo-activator | Surf-actant | Builder | Mois-ture | Other Components |
| | | | 91 | | 2 ol |

Photoactivators
pa tetrabenzo - α, β, γ, δ- tetrakis (4-N-methyl) pyridyl porphine tetraiodide
pb tetrakis (carboxybenzo) porphine zinc, tetrasodium salt
pc tetrakis (polyethoxy naphtho)-α, β, γ, δ - tetraphenyl porphine cadmium, tetra-ammonium salt
pd 1, 3, 5, 7 - tetrakis (sulfato polyethoxy phenyl) - α, β, γ, δ - tetrakis (carboxy naphthyl) porphine, octapotassium salt
pe 1, 2, 3, 4 - tetrakis (phosphato phenyl) - α, β, γ, δ - tetraphenyl porphine, tetra (triethanolamine) salt
pf dinaphtho - α, β, γ, δ - tetrakis (phosphatobenzo) porphine magnesium, tetraalithium salt
pg 1, 3, 5, 7 -tetrakis (polyethoxy phenyl) - α, γ, - di(polyethoxy phenyl) porphine
ph mono (polyethoxy benzo) - tribenzo - α, β, γ, δ - tetraphenyl porphine
pi bromo, tetrabenzo - α - (4-N-methyl) pyridyl - β, γ, δ - pyridly porphine scandium monobromide
pj 2, 4, 6, 8 - tetrakis (sulfophenyl-n-heptyl) tetraaza porphine, tetra (monoethanolamine) salt
pk tetrakis - (2-sulfatoethyl aminosulfonylbenzo) - tetraaza porphine zinc, tetrasodium salt
pl trans dichloro, - di (N-methyl pyrido) - α, β, γ, δ - tetrakis (4-carboxyphenyl) porphine tin (IV), tetrasodium salt
pm 1, 3, 5, - tri (4-polyethoxy) - α, β, γ - tri - (4-polyethoxy) - δ - aza - porphine
pn 2, 4, 6, 8 - tetrakis (carboxy methoxy) - α, β, γ, δ - tetraaza porphine, tetra (diethanolamine) salt
po tri (diphosphatobenzo) - α - (phosphatomethylbenzyl) - β, γ, γ - triaaza porphine, tetrasodium salt
pp tetra (carboxybenzo) - α, γ- di(carboxybenzo) - β, δ - diaza porphine zinc, hexasodium salt
Surfactants
sa C₁₂ branched chain alkyl benzene sulfonate (ABS), sodium salt
sb C₁₂ linear alkyl benzene sulfonate (LAS), sodium salt
sc coconut alkyl sulfate, sodium salt
sd beta-alkoxy alkane sulfonate containing 2 carbon atoms in the alkyl group and 16 carbon atoms in the alkane moiety
se C₁₆ paraffin sulfonate, sodium salt
sf C₁₄ alpha olefin sulfonate, sodium salt
sg C₁₈ alpha sulfocarboxylate, sodium salt
sh ethyl ester of C₁₈ alpha sulfocarboxylate, sodium salt
si tallow alkyl glyceryl ether sulfonate, sodium salt
sj tallow soap
sk alkyl polyethoxy alchohol sulfate having 11 carbon atoms in the alkyl group and 2 mols ethylene oxide per mol of alcohol, sodium salt
sl alkyl phenol polyethoxy alcohol sulfate having 9 carbon atoms in the alkyl group and 10 mols ethylene oxide per mol of alkyl phenol, sodium salt
sm alkyl polyethoxy alcohol having 16 carbon atoms in the alkyl group and 25 mols ethylene oxide per mol of alcohol
sn polyethoxy polypropoxy glycol having a molecular weight of 5000, half of which represents the polypropoxy base and half of which represents hydrophilic polyethoxylate
so dimethyl C₁₂ amine oxide
sp C₁₆ alkyl dimethyl ammonio propane sulfonate
sq C₁₂ linear alkyl benzene sulfonate (LAS), triethanolamine salt
sr coconut alkyl sulfate, potassium salt
Builders
ba sodium tripolyphosphate
bb sodium pyrophosphate
bc sodium nitrilotriacetate
bd citric acid
be sodium carbonate
bf sodium silicate solids, 2.0 ratio SiO₂/Na₂O
bg sodium silicate solids, 3.2 ratio SiO₂/Na₂O
bh sodium aluminosiliate Na₁₂(AlO₂ . SiO₂)₁₂ . 27 H₂O
bi potassium tetraborate
bj sodium bicarbonate
bk potassium hexametaphosphate
bl sodium orthophosphate
bm ethane-1-hydroxy-1,1-diphosphonate, sodium salt
bn potassium pyrophosphate
Other Components
oa polyethylene glycol, molecular weight 6000
ob perfume
oc potassium toluene sulfonate
od sodium sulfosuccinate
oe sodium carboxymethylcellulose
of optical brightener (fluorescer)
og colorant
oh protease
oi montmorrilonite clay
oj sodium perborate
ok ethanol
ol diethylene glycol monoethyl ether
om triethanolamine

What is claimed is:

1. A detergent bleach composition consisting essentially of:
   (a) from about 10% to about 50% by weight of the composition of surfactants selected from the group consisting of anionic, nonionic, semi-polar, ampholytic and zwitterionic surfactants;
   (b) from about 0.005% to about 0.5% by weight of the composition of a water soluble photoactivator having the formula

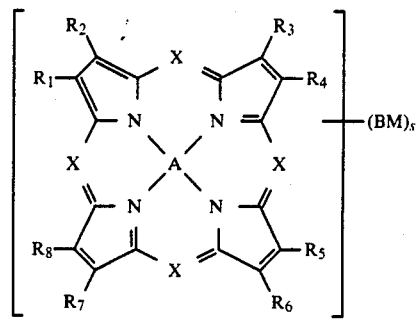

wherein each X is (=N—) or (=CY—), and the total number of (=N—) groups is 0, 1, 2, or 3 or 4; wherein each Y, independently is hydrogen or meso substituted alkyl, cycloalkyl, alkaryl, aryl, alkaryl or heteroaryl; wherein each R, independently, is hydrogen or pyrrole substituted alkyl, cycloalkyl, alkaryl aryl, alkaryl or heteroraryl, or wherein adjacent pairs of R's are joined together with ortho-arylene groups to form pyrrole substituted alicyclic or heterocyclic rings; wherein A is 2(H) atoms bonded to diagonally opposite nitrogen atoms, or Zn(II), Cd(II), Mg(II), Sc(III), or Sn(IV); wherein M is a counterion to the solubilizing groups; wherein s is the number of solubilizing groups; and wherein substituted into Y or R is B, a solubilizing group selected from the group consisting of (a) cationic groups, where M is an anion and s is from 1 to about 8; (b) polyethoxylate nonionic groups —(CH₂CH₂O)$_n$H, where M is zero, s is from 1 to about 8, and N=(sn)=the number of (condensed ethylene oxide molecules per porphine molecule) is from about 8 to about 50; (c) proximate anionic groups attached to atoms no more than 5 atoms displaced from the porphine core, where M is cationic and s is from 3 to about 8; and (d) remote anionic groups attached to atoms more than 5 atoms displaced from the porphine core, where M is cationic and s is from 2 to about 8; provided that anionic sulfonate groups are remote and are no greater in number than the number of aromatic and heterocyclic substituent groups;
wherein said alkyl groups are comprised of simple carbon chains or carbon chains interrupted by other chain-forming atoms;
   (c) from 0 to about 80% by weight of the composition of alkaline detergent builder selected from the group consisting of inorganic and organic builders; and
   (d) balance selected from the group consisting of sodium sulfate, smectite clay, alkanolamine, water, lower alcohols and glycols, and hydrotropes.

2. The composition of claim 1 wherein the solubilizing groups are cationic and are selected from the group consisting of quaternary ammonium salts

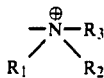

and quaternary pyridinium salts

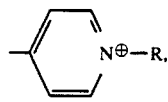

where all R's are alkyl or substituted alkyl groups.

3. The composition of claim 2 wherein s is from 1 to about 4 and M is halide or toluene sulfonate.

4. The composition of claim 3 wherein the weight percent of the photoactivator in the composition is from about 0.01% to about 0.1%, the weight ratio of photoactivator to surfactant is from about 1/300 to about 1/60 and the chain-forming atoms are selected from the group consisting of C, O, N and S.

5. A process for removing stains from textiles which comprises treating the textiles, in the presence of visible light and oxygen, with an aqueous solution of the detergent bleach composition of claim 4.

6. The composition of claim 4 wherein the surfactant is selected from the group consisting of water soluble salts of alkyl benzene sulfonate, alkyl sulfate, alkyl polyethoxy ether sulfate, paraffin sulfonate, alpha-olefin sulfonate, alpha-sulfocarboxylates and their esters, alkyl glyceryl ether sulfonate, fatty acid monogrlyceride sulfates and sulfonates, alkyl phenol polyethoxy ether sulfate, 2-acyloxy-alkane-1-sulfonate, beta-alkyloxy alkane sulfonate, soap; water soluble compounds produced by the condensation of ethylene oxide with an alcohol, alkyl phenol, polyproxy glycol or polyproxy ethylene diamine; water soluble amine oxides, phosphine oxides, and sulfoxides; water soluble derivatives of aliphatic secondary and tertiary amines; and water soluble derivatives of aliphatic quaternary ammonium, phosphonium, and sulfonium cationic compounds.

7. The composition of claim 6 containing from about 10% to about 60% of an alkaline detergent builder selected from the group consisting of water soluble alkali metal carbonates, borates, phosphates, polyphosphates, bicarbonates and silicates; water soluble aminopolycarboxylates, phytates, polyphosphonates, and polycarboxylates; and water insoluble aluminosilicates.

8. A process for removing stains from textiles which comprises treating the textiles, in the presence of visible light and oxygen, with an aqueous solution of the detergent bleach composition of claim 7.

9. The composition of claim 1 wherein the solubilizing groups are anionic and are carboxylate, polyethoxy carboxylate, sulfate, polyethoxy sulfate, phosphate, polyethoxy phosphate, or remote sulfonate.

10. The composition of claim 9 wherein the solubilizing groups are proximate, s is from 3 to about 4, and M is an alkali metal, ammonium or ethanolamine salt.

11. The composition of claim 10 wherein the weight percent of the photoactivator in the composition is from about 0.01% to about 0.1%, the weight ratio of photoactivator to surfactant is from about 1/300 to about 1/60 and the chain-forming atoms are selected from the group consisting of C, O, N and S.

12. A process for removing stains from textiles which comprises treating the textiles, in the presence of visible light and oxygen, with an aqueous solution of the detergent bleach composition of claim 11.

13. The composition of claim 11 wherein the surfactant is selected from the group consisting of water soluble salts of alkyl benzene sulfonate, alkyl sulfate, alkyl polyethoxy ether sulfate, paraffin sulfonate, alpha-olefin sulfonate, alpha-sulfocarboxylates and their esters, alkyl flyceryl ether sulfonate, fatty acid monoglyceride sulfates and sulfonates, alkyl phenol polyethoxy ether sulfate, 2-acyloxy-alkane-1-sulfonate, beta-alkyloxy alkane sulfonate, soap; water soluble compounds produced by the condensation of ethylene oxide with an alcohol, alkyl phenol, polyproxy glycol or polyproxy ethylene diamine; water soluble amine oxides, phosphine oxides, and sulfoxides; water soluble derivatives of aliphatic secondary and tertiary amines; and water soluble derivatives of aliphatic quaternary ammonium, phosphonium, and sulfonium cationic compounds.

14. The composition of claim 13 containing from about 10% to about 60% of an alkaline detergent builder selected from the group consisting of water soluble alkali metal carbonates, borates, phosphates, polyphosphates, bicarbonates and silicates; water soluble aminopolycarboxylates, phytates, polyphosphonates, and polycarboxylates; and water insoluble aluminosilicates.

15. A process for removing stains from textiles which comprises treating the textiles, in the presence of visible light and oxygen, with an aqueous solution of the detergent bleach composition of claim 14.

16. The composition of claim 9 wherein the solubilizing groups are remote, s is from 2 to about 4, and M is an alkali metal, ammonium or ethanolamine salt.

17. The composition of claim 16 wherein the weight percent of the photoactivator in the composition is from about 0.01% to about 0.1%, the weight ratio of photoactivator to surfactant is from about 1/300 to about 1/60 and the chain-forming atoms are selected from the group consisting of C, O, N and S.

18. A process for removing stains from textiles which comprises treating the textiles, in the presence of visible light and oxygen, with an aqueous solution of the detergent bleach composition of claim 17.

19. The composition of claim 17 wherein the surfactant is selected from the group consisting of water soluble salts of alkyl benzene sulfonate, alkyl sulfate, alkyl polyethoxy ether sulfate, paraffin sulfonate, alpha-olefin sulfonate, alpha-sulfocarboxylates and their esters, alkyl glyceryl ether sulfonate, fatty acid monoglyceride sulfates and sulfonates, alkyl phenol polyethoxy ether sulfate, 2-acyloxy-alkane-1-sulfonate, beta-alkyloxy alkane sulfonate, soap; water soluble compounds produced by the condensation of ethylene oxide with an alcohol, alkyl phenol, polyproxy glycol or polyproxy ethylene diamine; water soluble amine oxides, phosphine oxides, and sulfoxides; water soluble derivatives of aliphatic secondary and tertiary amines; and water soluble derivatives of aliphatic quaternary ammonium, phosphonium, and sulfonium cationic compounds.

20. The composition of claim 19 containing from about 60% of an alkaline detergent builder selected from the group consisting of water soluble alkali metal carbonates, borates, phosphates, polyphosphates, bicarbonates and silicates; water soluble aminopolycarboxylates, phytates, polyphosphonates, and polycarboxylates; and water insoluble aluminosilicates.

21. A process for removing stains from textiles which comprises treating the textiles, in the presence of visible light and oxygen, with an aqueous solution of the detergent bleach composition of claim 20.

22. The composition of claim 1 or 21 wherein the solubilizing groups are nonionic and N is from about 12 to about 40.

23. The composition of claim 22 wherein the weight percent of the photactivator in the composition is from about 0.01% to about 0.1%, the weight ratio of photoactivator to surfactant is from about 1/300 to about 1/60 and the chain-forming atoms are selected from the group consisting of C, O, N and S.

24. A process for removing stains from textiles which comprises treating the textiles, in the presence of visible light and oxygen, with an aqueous solution of the detergent bleach composition of claim 23.

25. The composition of claim 23 wherein the surfactant is selected from the group consisting of water soluble salts of alkyl benzene sulfonate, alkyl sulfate, alkyl polyethoxy ether sulfate, paraffin sulfonate, alph-olefin sulfonate, alpha-sulfocarboxylates and their esters, alkyl glyceryl ether sulfonate, fatty acid monoglyceride sulfates and sulfonates, alkyl phenol polyethoxy ether sulfate, 2-acyloxy-alkane-1-sulfonate, beta-alkyloxy alkane sulfonate, soap; water soluble compounds produced by the condensation of ethylene oxide with an alcohol, alkyl phenol, polyproxy glycol or polyproxy ethylene diamine; water soluble amine oxides, phosphine oxides, and sulfoxides; water soluble derivatives of aliphatic secondary and tertiary amines; and water soluble derivatives of aliphatic quaternary ammonium, phosphonium, and sulfonium cationic compounds.

26. The composition of claim 25 containing from about 10% to about 60% of an alkaline detergent builder selected from the group consisting of water soluble alkali metal carbonates, borates, phosphates, polyphosphates, bicarbonates and silicates; water soluble aminopolycarboxylates, phytates, polyphosphonates, and polycarboxylates; and water insoluble aluminosilicates.

27. A process for removing stains from textiles which comprises treating the textiles, in the presence of visible light and oxygen, with an aqueous solution of the detergent bleach composition of claim 26.

28. The composition of claim 21 wherein the weight ratio of photoactivator to surfactant is from about 1/10,000 to about 1/20.

29. The composition of claim 28 wherein the weight percent of the photoactivator in the composition is from about 0.01% to about 0.1%, the weight ratio of photoactivator to surfactant is from about 1/300 to about 1/60 and the chain-forming atoms are selected from the group consisting of C, O, N and S.

30. The composition of claim 29 wherein the surfactant is selected from the group consisting of water soluble salts of alkyl benzene sulfonate, alkyl sulfate, alkyl polyethoxy ether sulfate, paraffin sulfonate, alpha-olefin sulfonate, alpha-sulfocarboxylates and their esters, alkyl glyceryl ether sulfonate, fatty acid monoglyceride sulfates and sulfonates, alkyl phenol polyethoxy ether sulfate, 2-acyloxy-alkane-1-sulfonate, beta-alkyloxy alkane sulfonate, and soap; water soluble compounds produced by the condensation of ethylene oxide with an alcohol, alkyl phenol, polyproxy glycol or polyproxy ethylene diamine; water soluble amine oxides, phosphine oxides, and sulfoxides; water soluble derivatives of aliphatic secondary and tertiary amines; and water soluble derivatives of aliphatic quaternary ammonium, phosphonium, and sulfonium cationic compounds.

31. A process for removing stains from textiles which comprises treating the textiles, in the presence of visible light and oxygen, with an aqueous solution of the detergent bleach composition of claim 1 or 21.

32. A detergent bleach composition consisting essentially of:
(a) from about 10% to about 50% by weight of the composition of surfactants selected from the group consisting of anionic, nonionic, semi-polar, ampholytic and zwitterionic surfactants;
(b) from about 0.005% to about 0.5% by weight of the composition of a water soluble photoactivator having the formula

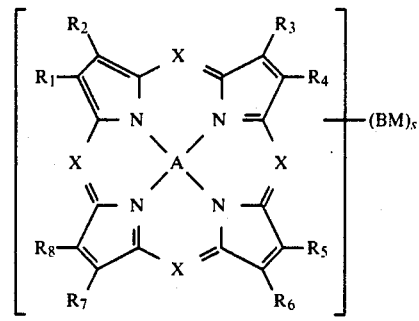

wherein each X is (=N—) or (=CY—), and the total number of (=N—) groups is 0, 1, 2, or 3; wherein each Y, independently is hydrogen or meso substituted alkyl, cycloalkyl, alkaryl, aryl, alkaryl or heteroaryl; wherein each R, independently, is hydrogen or pyrrole substituted alkyl, cycloalkyl, alkaryl aryl, alkaryl or heteroraryl, or wherein adjacent pairs of R's are joined together with ortho-arylene groups to form pyrrole substituted alicyclic or heterocyclic rings; wherein A is 2(H) atoms bonded to diagonally opposite nitrogen atoms, or Zn(II), Ca(II), Cd(II), Mg(II), Sc(III), Al(III) or Sn(IV); wherein M is a counterion to the solubilizing groups; wherein s is the number of solubilizing groups; and wherein substituted into Y or R is B, a solubilizing group selected from the group consisting of (a) cationic groups, where M is an anion and s is from 1 to about 8; (b) polyethoxylate nonionic groups -$(CH_2CH_2O)_nH$, where M is zero, s is from 1 to about 8, and N =(sn)= the number of (condensed ethylene oxide molecules per porphine molecule) is from about 8 to about 50; (c) proximate anionic groups attached to atoms no more than 5 atoms displaced from the porphine core, where M is cationic and s is from 3 to about 8; and (d) remote anionic groups attached to atoms more than 5 atoms displaced from the porphine core, where M is cationic and s is from 2 to about 8; provided that anionic sulfonate groups are remote and are no greater in number than the number of aromatic and heterocyclic substituent groups; wherein said alkyl groups are comprised of simple carbon chains or carbon chains interrupted by other chain-forming atoms;
(c) from 0 to about 80% by weight of the composition of alkaline detergent builder selected from the group consisting of inorganic and organic builders; and
(d) balance selected from the group consisting of sodium sulfate, smectite clay, alkanolamine, water, lower alcohols and glycols, and hydrotropes.

* * * * *